United States Patent [19]
Kitani

[11] Patent Number: 5,708,492
[45] Date of Patent: Jan. 13, 1998

[54] PROGRESSIVE POWER MULTIFOCAL LENS

[75] Inventor: Akira Kitani, Tokyo, Japan

[73] Assignees: Hoya Corporation; Hoya Lens Corporation, both of Tokyo, Japan

[21] Appl. No.: 716,072

[22] Filed: Sep. 19, 1996

[30] Foreign Application Priority Data

Sep. 22, 1995 [JP] Japan ................... 7-244712

[51] Int. Cl.$^6$ ................... G02C 7/06
[52] U.S. Cl. ................... 351/169
[58] Field of Search ................... 351/169

[56] References Cited

FOREIGN PATENT DOCUMENTS

| 47-23943 | 10/1972 | Japan. |
|---|---|---|
| 49-3595 | 1/1974 | Japan. |
| A-4-500870 | 2/1992 | Japan. |
| A-5-20729 | 1/1993 | Japan. |
| A-6-18823 | 1/1994 | Japan. |
| WO 91/01508 | 2/1991 | WIPO. |

*Primary Examiner*—Frank G. Font
*Assistant Examiner*—Jason D. Vierra-Eisenberg
*Attorney, Agent, or Firm*—Oliff & Berridge, P.L.C.

[57] ABSTRACT

A progressive power multifocal lens by which a substantially good "broad field of view" can be obtained for an eyeglass wearer without increasing time and cost required to produce the prescribed surface thereof. This progressive power multifocal lens belongs to a group of progressive power multifocal lenses designed under a certain rule in such a manner that fundamental elements such as a far vision power measuring position F and a near vision power measuring position N thereof meet a common wearing object. Further, in the case of this lens, a surface refractive power (in units of diopters) at the far vision power measuring position F is employed as a base curve (Bi). Moreover, a difference in surface refractive power between the far vision power measuring position F and the near vision power measuring position N is employed as an addition Di (in units of diopters). Furthermore, let W(Di, Bi) denote a width of a region in which values of a surface average additional refractive power along a horizontal section line extending below the near vision power measuring position N are not less than Di/2. In such a case, when arbitrary two progressive power multifocal lenses, whose additions are Da and base curves are B1 and B2, respectively, are extracted or selected from the group of the progressive power multifocal lenses, the following relation holds for B1>B2:

W(Da, B1)>W(Da, B2).

5 Claims, 22 Drawing Sheets

F I G. 2
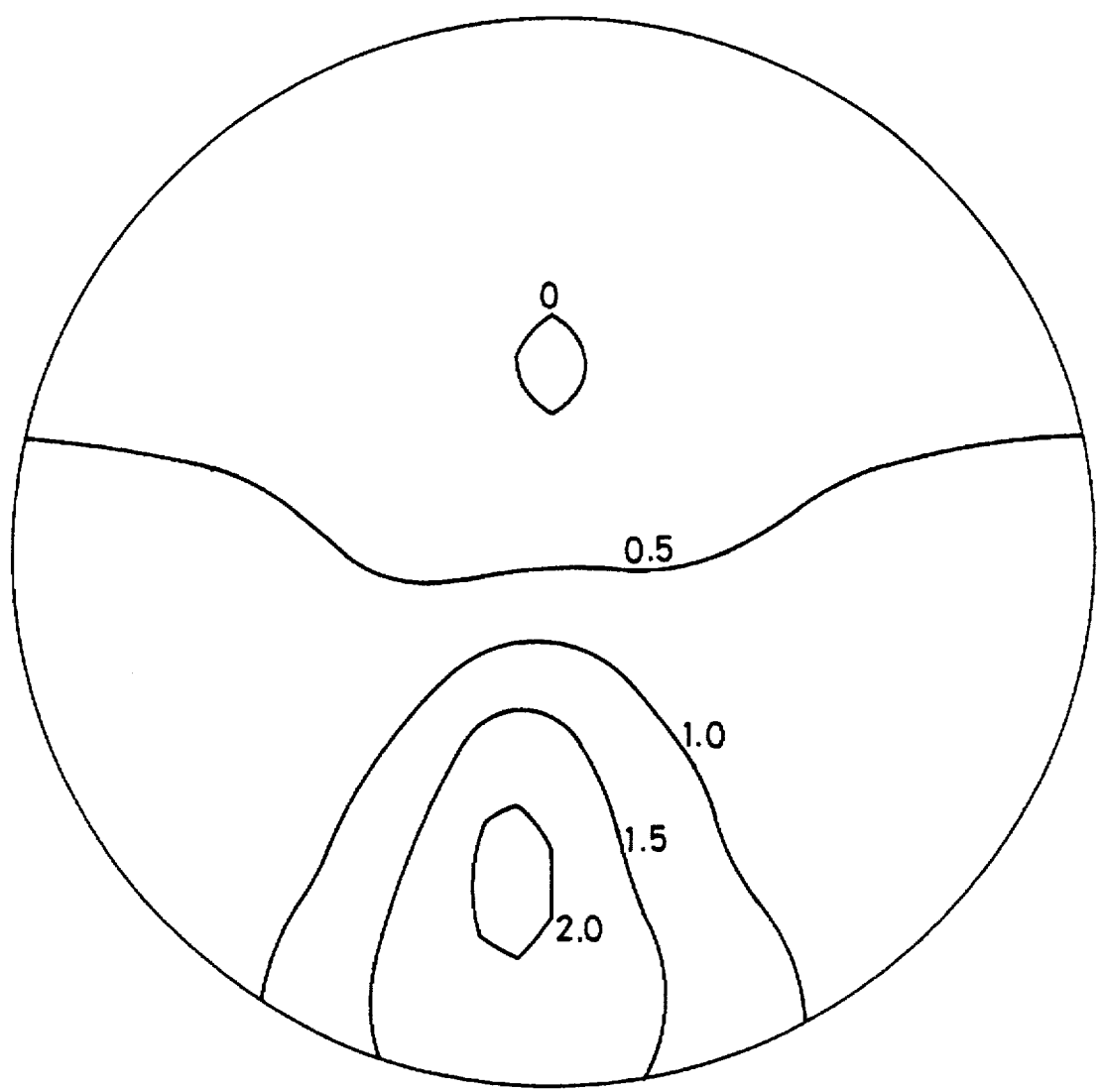

F I G. 4
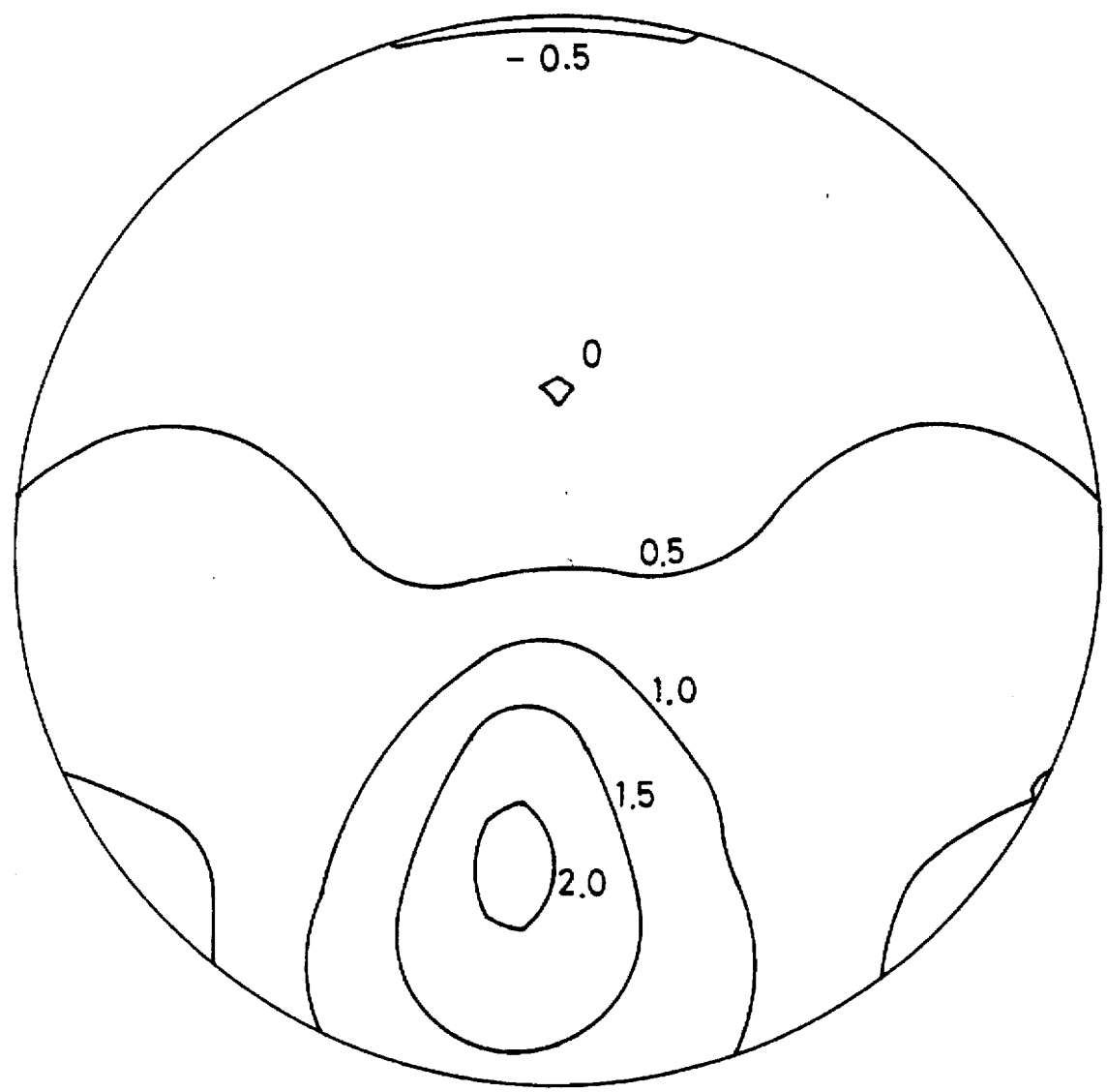

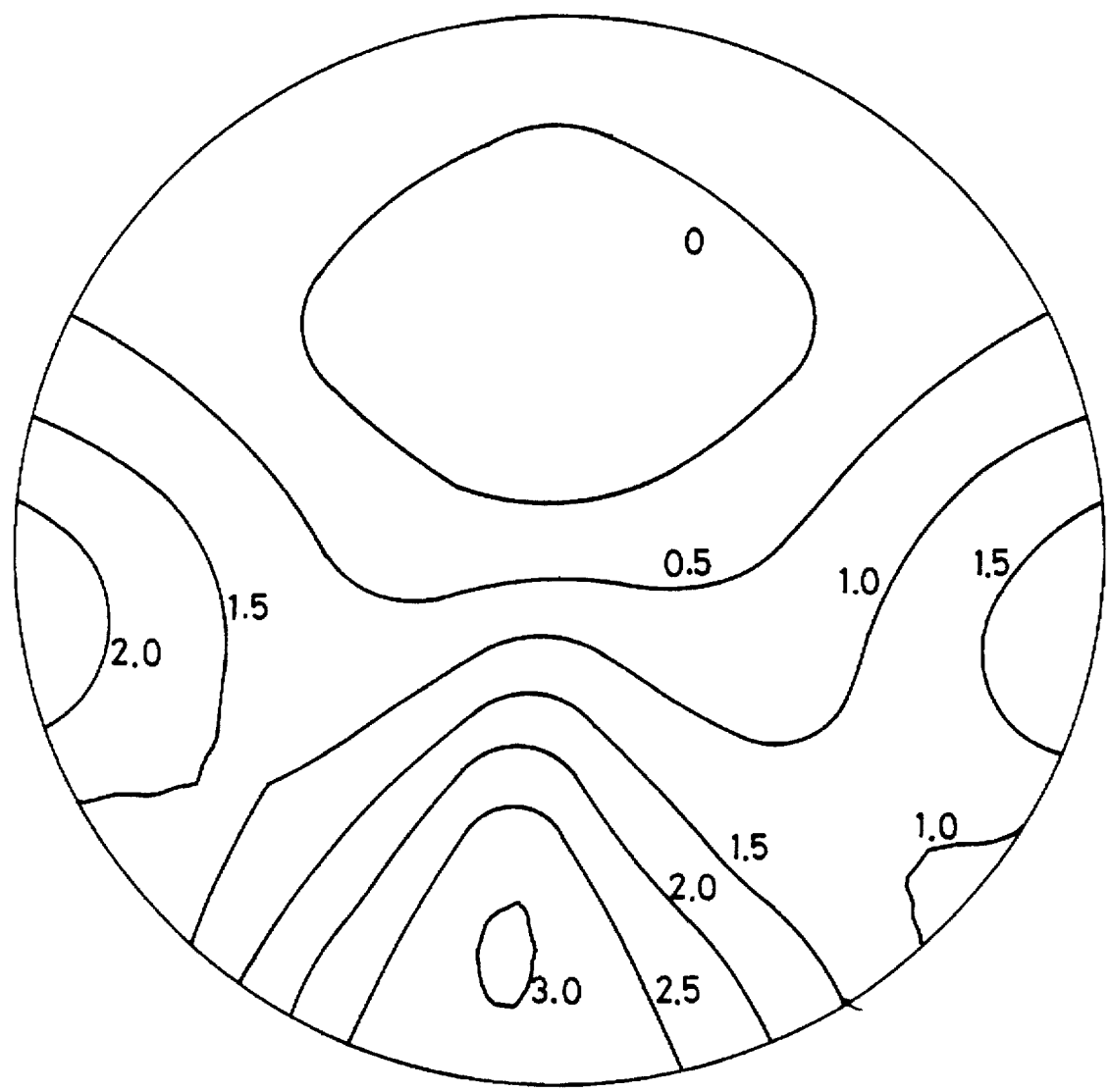
F I G. 5

F I G. 1 1
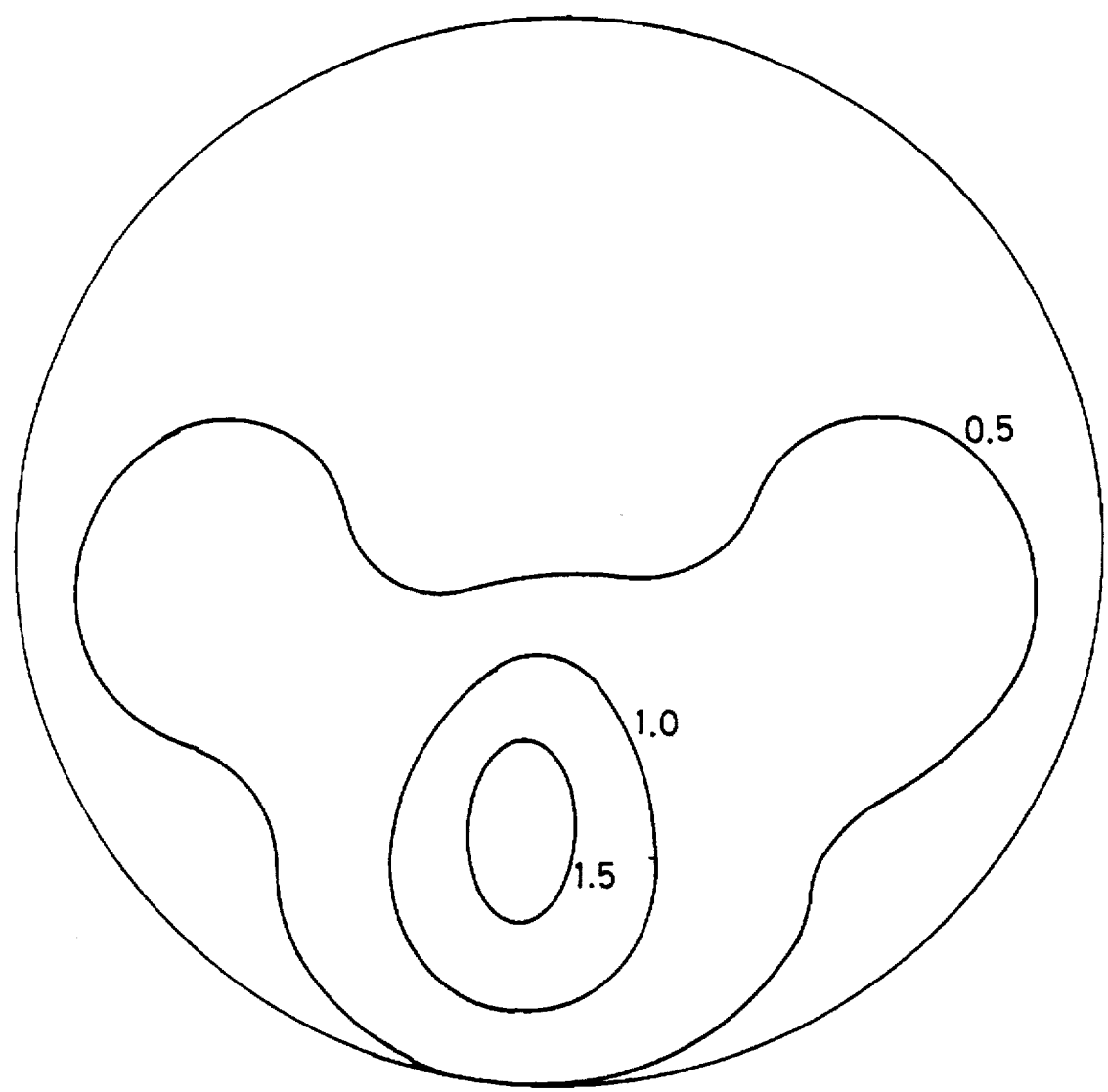

ADD
2.00
0.25 D PITCH

ADD
1.00
0.125 D PITCH

F I G. 2 3

TENDENCIES OF SURFACE DISTRIBUTIONS
RELATIVE TO TRANSMISSION DISTRIBUTIONS

| FAR VISION POWER | | ASTIGMATISM DISTRIBUTION | AVERAGE POWER DISTRIBUTION |
|---|---|---|---|
| +POWER +4.50 (D) | DISTANCE PORTION | THE UPPER PART, THE MORE INCREASE | INCREASES SLIGHTLY THROUGHOUT PORTION |
| | SIDE PORTION | INCREASES SOMEWHAT THROUGHOUT PORTION | DECREASES SLIGHTLY THROUGHOUT PORTION |
| | READING PORTION | LITTLE CHANGES | DECREASES THROUGHOUT PORTION |
| −POWER −5.50 (D) | DISTANCE PORTION | INCREASES SOMEWHAT IN CENTRAL PART | DECREASES LARGELY IN CENTRAL PART |
| | SIDE PORTION | THE MORE SIDEWISE PART, THE MORE INCREASE | THE MORE SIDEWISE PART, THE MORE INCREASE |
| | READING PORTION | THE LOWER PART, THE MORE INCREASE | THE LOWER PART, THE MORE INCREASE |

PROGRESSIVE POWER MULTIFOCAL LENS

BACKGROUND OF THE INVENTION

1. Field of The Invention

The present invention generally relates to spectacle lenses (or eyeglass lenses) and more particularly to a progressive power multifocal lens for presbyopia.

2. Description of The Related Art

Generally, in a progressive power multifocal lens, there are a zone designated as "a far (or distance) vision viewing portion" (hereunder sometimes referred to simply as a distance portion or as a farsight portion) for viewing long-distance places, another zone designated as "an intermediate vision viewing portion" (hereunder sometimes referred to simply as a middle portion or as an intermediate portion) for viewing middle-distance places and still another zone designated as "a near vision viewing portion" (hereunder sometimes referred to simply as a reading (or near) portion or a nearsight portion) for viewing short-distance places. Incidentally, the term "middle-distance" referred herein often designates distance ranging from 50 centimeters (cm) to 2 meters (m) approximately. Further, the term "long-distance" frequently designates (namely, means) distance longer than the middle-distance. Moreover, the term "short-distance" often designates distance shorter than the middle-distance. However, in some case, the term "long-distance" designates only infinite distance in some cases. Furthermore, sometimes, the term "short-distance" designates distance ranging from 30 cm to 33 cm. Thus, as matters stand, there are no definite definitions of these terms.

Originally, there are no apparently clear boundaries among these zones on a progressive power multifocal lens. Therefore, even though these terms are not defined definitely, there is no inconvenience in actually wearing progressive power multifocal lenses. However, when a lens is designed, manufactured, inspected and further put into a rim or frame, some reference points, which are precisely defined on the lens, become necessary. Among such points, presently most common points are the following three points: a far vision power measuring position (namely, a position for measuring the (refractive) power of a lens in the case of a far vision) F; a near vision power measuring position (namely, a position for measuring the (refractive) power thereof in the case of a near vision) N; and a position E through which a visual line (namely, a line of sight) of an eyeglass wearer (namely, a person wearing the lens) passes when his or her eyes are in a frontal vision condition (namely, in a front viewing condition).

The determination of the far vision power measuring position F and the near vision power measuring position N of a lens is unavoidable for checking whether or not the lens is within specifications determined according to ISO (International Standards Organization) standards, JIS (Japanese Industrial Standards) or the like. Further, the position E, through which a visual line (namely, a line of sight) of a wearer passes, is indispensable for determining the vertical or horizontal direction when a lens is put into a rim or frame.

In addition, for example, a position Q for measuring the (prism) refractive power of a lens is necessary. These points, however, are often made to coincide with the geometric center (or central point) G thereof. Incidentally, in the case of a lens on which the position F is preliminarily inwardly offset (or deviated) towards the nose of an eyeglass wearer, it is usual that each of the positions Q, N and E is also deviated inwardly from the normal position thereof by a distance being equal to the deviation (or offset) of the position F. Further, the starting and end points of a progressive change in refractive power are important. It is, however, not mandatory to indicate the starting point and the end point on the surface of the lens. Moreover, it is difficult to specify the locations of these points through actual measurement thereof. Thus, such starting and end points are somewhat unsuitable for reference points to be used for describing techniques employed in an invention. Furthermore, it is often that the positions F and N of a lens are shifted upwardly and downwardly therefrom by a distance (namely, 2 to 4 millimeters (ram) or so), which corresponds to the radius of an aperture portion of a lensmeter (or lensometer), respectively.

Meanwhile, the quality of a progressive power multifocal lens has been discussed according to whether or not the optical conditions (for example, a change in surface astigmatism, a change in axial surface astigmatism, a change in average additional surface refractive power, a change in the horizontal direction of a prism refractive power and a change in the vertical direction of the prism refractive power) of a lens surface of the progressive power multifocal lens are appropriate. For instance, in Japanese Patent Publication Nos. 49-3595/1974 and 520729/1993 Official Gazettes, it is described that a range of micro- spherical-surfaces, which is named as "an umbilical meridian", is placed along a main or principal fixation line in an almost central portion of the lens and that "because the umbilical meridian is a range of micro- spherical-surfaces, no astigmatism is caused and a good field of view is obtained". However, it holds just for a surface of the lens that "no astigmatism is caused owing to the sphericalness of the micro-spherical-surfaces of the umbilical meridian". Namely, the lens is not put into a state in which no astigmatism is caused by what is called "transmitted light" that has been transmitted by the lens and then reached an eyeglass wearer. The same goes for the average refracting power. Thus, even when the average surface refracting power distribution is uniform as in the case of the "spherical surface", the surface refracting power distribution in the case of the transmitted light cannot be uniform. This tendency is notable in peripheral portions such as the nearsight portion of the lens and in the case of high far-vision power. The distributions of average refractive powers and astigmatism in the case of the "transmitted light" having actually reached the eyes of an eyeglass wearer are largely different from those of the aforementioned average "surface" refractive powers and the aforesaid "surface" astigmatism, respectively.

Further, the case of the "transmitted light" is referred to in Japanese Patent Publication No. 47-23943/1972 Official Gazette and Japanese Patent National Publication No. 4-500870/1992 Official Gazette and Japanese Patent Unexamined Publication No. 618823/1994 Official Gazette.

However, each of the aforesaid Japanese Patent Publication No. 47-23943/1972 Official Gazette and Japanese Patent National Publication No. 4-500870/1992 Official Gazette refers only to the astigmatism occurring on the principal fixation line. From the viewpoint of providing an eyeglass wearer with a good "broad field of view" only by regulating astigmatism occurring on a single line, the lenses disclosed in these Official Gazettes are incompetent as a progressive power multifocal lens.

Further, Japanese Patent Unexamined Publication No. 6-18823/1994 Official Gazette discloses a lens that has a first surface (namely, the front surface) formed as a "progressive (power) surface" and a second surface (namely, the back surface) by which all of the inconveniences of the distribution of optical conditions of the lens in the case of using "transmitted light" are obviated. The second surface (namely, the back surface) of this lens is disclosed therein merely as an "aspherical surface without point symmetry and axial symmetry". Moreover, no practical calculation method is disclosed therein.

Furthermore, no practical method for changing a parameter concerning the optical conditions of the lens in the case of using "transmitted light" is also disclosed therein. Especially, note that both of the improvement of the transmission average refractive power and the obviation of the transmission astigmatism cannot always be achieved at the same time. As a consequence, an attempt to achieve the balance between the transmission average refractive power and the transmission astigmatism should be made. Methods for achieving the balance therebetween are inherent in the inventions disclosed therein but are not referred to therein at all.

Here, in the case where the second surface (namely, the back surface), which is a prescribed surface, is an aspherical surface, it is obvious that the time and cost required to produce a lens would increase owing to the aspherical surface processing. Further, because this aspherical surface is an aspherical one, the lens has to be produced after a reception of an order. Namely, a method of preliminarily receiving an order cannot be employed. Therefore, in addition to the time and cost required to produce a lens, delivery time after reception of prescribed values is disadvantageous to this method, in comparison with the currently-used method which has previously been described.

The present invention is accomplished to eliminate the drawbacks of these methods.

It is, accordingly, an object of the present invention to provide a progressive power multifocal lens, by which an eyeglass wearer can obtain a substantially good "broad field of view", without increasing time and cost required to produce a prescribed surface thereof.

SUMMARY OF THE INVENTION

To achieve the foregoing object, in accordance with the present invention, there is provided a progressive power multifocal lens that belongs to a group of progressive power multifocal lenses designed under a certain rule in such a manner that fundamental elements such as a far vision power measuring position F and a near vision power measuring position N of a progressive power multifocal lens meet a common wearing object. In the case of this lens, a surface refractive power (in units of diopters) at the far vision power measuring position F is employed as a base curve (Bi). Further, a difference in surface refractive power between the far vision power measuring position F and the near vision power measuring position N is employed as an addition Di (in units of diopters). Furthermore, let W(Di, Bi) denote a width of a region in which values of a surface average additional refractive power along a horizontal section line extending below the near vision power measuring position N are not less than Di/2.

In such a case, when arbitrary two progressive power multifocal lenses, whose additions are Da and base curves are B1 and B2, respectively, are extracted or selected rom the group of the progressive power multifocal enses, the following relation holds for B1>B2:

W(Da, B1)W(Da, B2).

Thus, there can be obtained a progressive power multifocal lens by which an eyeglass wearer can obtain a substantially good "broad field of view", without increasing time and cost required to produce a prescribed surface thereof.

Moreover, preferably, in the case of an embodiment of the hereinabove-mentioned progressive power multifocal lens of the present invention, when a single curve passing through at least both of the far vision power measuring position F and the near vision power measuring position N is employed as a principal fixation line, a horizontal deviation H of an arbitrary point P on the principal fixation line towards the nose of a wearer with respect to the far vision power measuring position F is given by:

H=K–Dp/Di where K is an arbitrary constant meeting the following inequality $1.0 \geq K \leq 5.0$; Dp the additional surface refractive power at the point P; and Di an addition.

Furthermore, preferably, in the case of an embodiment of any of the aforementioned progressive power multifocal lenses of the present invention, a change in optical conditions along a horizontal (or transverse) section curve intersecting with the principal fixation line at an arbitrary point P occurs in such a manner that in a portion where the principal fixation line is not horizontally (or laterally) deviated from the horizontal (or lateral) location of the far vision power measuring position F, the optical conditions are symmetric with respect to a plane which contains the point P and is perpendicular to the section curve and serves as a plane of mirror symmetry and that in another portion where the principal fixation line is horizontally (or laterally) deviated to the nose of a wearer from the horizontal (or lateral) location of the far vision power measuring position F, the change in the optical conditions along a horizontal section curve extending from the point P to the nose thereof is larger than the change in the optical conditions along another horizontal section curve extending from the point P to an ear thereof.

Furthermore, preferably, in the case of an embodiment of any of the aforementioned progressive power multifocal lenses of the present invention, the addition (Di) has a value ranging from 0.75 diopters to 3.00 diopters. Here, let W(Di, X) (millimeters (mm)) represent a width of a region in which the value of astigmatism along the horizontal section curve passing through the near vision power measuring position N is not more than X.

In this case, when arbitrary two progressive power multifocal lenses, whose additions are Da and Db, respectively, and base curves are the same with each other, are selected from the group of the progressive power multifocal lenses, the following relation holds for the addition Da>Db:

W(Da, X)>W(Db, X–Db/Da).

where X=1.00 diopter.

Further, preferably, in the case of any of the progressive power multifocal lenses of the present invention, an arbitrary point P on a part of the principal fixation line, which is other than the far vision power measuring position F and the near vision power measuring position N, has two different principal curvatures (namely, maximum and minimum curvatures corresponding to this point P).

Hereinafter, the present invention will be described more detailedly.

As for the distribution of distinct vision area among the "distance portion", the "middle portion" and the "reading portion" in an ordinary progressive power multifocal lens, the area of the distinct vision region in the "distance portion" is largest, though the ratio among the areas of the distinct vision regions respectively provided in the three portions varies more or less with the kind of the progressive power multifocal lens. This is because the progressive power multifocal lenses should cope with the extremely high frequency of using the far vision in daily life. Moreover, the sensitivity of human eyes to astigmatism has a tendency to become highest in the case of using the far vision and to become dull as the eyesight to be used is changed from the intermediate vision to the near vision.

Wearing tests conducted in the inventor's own way reveal that the distinct region in the case of using the far vision should have astigmatism which is not more than about 0.5 diopters and that in the case of using the near vision, an object can be distinctly viewed if the value of astigmatism ranges from about 0.75 diopters to about 1.00 diopter. It is, therefore, judged as being unreasonable to make a simple comparison among the areas of the distinct vision regions respectively provided in the portions at a ceratin value of astigmatism.

Further, the quality of a progressive power multifocal lens should be discussed according to whether or not the distribution of optical conditions (or properties) of the entire lens corresponding to the field of view are suitable. The present invention, thus, aims to improving the "optical conditions" of the lens in the case of using "transmitted light" by grasping the difference thereof from the "optical conditions on the lens surface" through a conjecture based on the "optical conditions on the lens surface", which is logically insufficient or imperfect, and through the prediction of the distributions of the average refractive power and the astigmatism of the lens in the case of using the "transmitted light" having substantially reached an eye of an eyeglass wearer in addition to the condition of astigmatism on a single line and by then feeding back the difference to the "optical conditions on the lens surface".

This object of the present invention itself is similar to an object of the invention disclosed in the aforementioned Japanese Patent Unexamined Publication No. 6-18823/1994 Official Gazette. Such a mere desire is not all what the present application describes. The present application further proposes a practical improvement method, by which the object of the present invention can be attained without increasing the time and cost required to produce a prescribed surface.

Namely, first, similarly as in the case of the conventional lens, the prescribed surface is shaped like a spherical surface or what is called an astigmatic surface, which is relatively easily produced so that the time and cost required to produce the prescribed surface do not increase. Thus, when preparing a semi-finished goods which employ "progressive (power) surfaces" as first (or front) surfaces and have several kinds of base curves, the range of the far vision power, at which the semi-finished goods are used, is preliminarily determined. Moreover, the shape of the progressive surface of each of the semi-finished goods is adjusted to that which is most suitable for the corresponding far vision power range. Thereby, a substantially good "broad field of view" can be ensured for an eyeglass wearer without increasing time and cost required to produce the prescribed surface thereof.

Meanwhile, the differences among various kinds of progressive power multifocal lenses are those in the "average refractive power distribution" and the "astigmatism distribution". The ease-of-use of each of the lenses varies with the differences in these distributions therebetween. Incidentally, the term "an average refractive power distribution" (of a lens) designates a distribution of additional refractive power used to compensate for deficiency of the amplitude of accommodation of an eyeglass wearer, and more specifically, designates "a surface average refractive power distribution" obtained by subtracting the base curve of a lens, namely, a surface refractive power at the far vision power measuring position F from the average refractive power distribution on the surface of the lens. Further, the term "an astigmatism distribution" designates a difference between two principal curvatures on the surface of a lens, namely, designates a "surface astigmatism distribution".

The conventional progressive power multifocal lenses have been evaluated by representing optical information on the lens surface in the form of a distribution chart or diagram, and then discussing whether or not the distribution represented by the distribution diagram is suitable for an eyeglass wearer.

However, light actually reaching an eye of the eyeglass wearer is "transmitted light" that has been transmitted and refracted by a spectacle lens. Therefore, no matter how superior the "diagram for illustrating the optical information distribution on the surface of a lens" is, this does not make sense if a "diagram for illustrating the optical information distribution in the case of using light transmitted by the lens" is not superior. Namely, matters of importance are not the "surface average refractive power distribution" and the "surface astigmatism distribution" but a "transmission average refractive power distribution" and a "transmission astigmatism distribution". There is an approach to obtaining "diagrams for illustrating these optical information distributions in the case of using transmitted light" by actually measuring or observing these distributions. Judging from the viewpoint of the feedback of such information to a lens design, this approach is impractical. Consequently, in accordance with the present invention, the "diagrams for illustrating the optical information distributions in the case of using transmitted light" are drawn by obtaining whole data by calculation.

As to parameters necessary for this calculation, all factors respectively determining the shape of spectacle lenses and the positional relation between each of the eyeballs of an eyeglass wearer and an object are needed, in addition to the refractive index of the material of the lens.

As shown in FIG. 22, actual lenses, however, are fitted into an eyeglass frame or rim. Further, the eyeglass lenses are worn by a wearer in such a manner that each of the lenses is at a distance of about 12 to 15 mm or so forwardly away from the corresponding eye of the wearer and is bent forwardly from the vertical direction at an angle of 5 to 10 degrees or so (in the case of FIG. 22, 7 degrees are employed as such an angle). Actually, the aforementioned factors are an angle formed between a visual line and each of the two surfaces of the lens, the thickness of the lens at a place where each of the surfaces of the lens intersects with the visual line, the refractive powers respectively corresponding to the two surfaces of the lens, the vertex distance from the vertex of (the anterior surface of) the cornea of each eye of the wearer to the lens (incidentally, in the case of FIG. 22, 12 mm is employed as this distance), the distance from the vertex of the cornea to the center of rotation of each eyeball (incidentally, in the case of FIG. 22, 13 mm is employed as this distance), the distance from the lens to the object, prismatic thinning correction data (incidentally, in the case of FIG. 22, the prism power is brought down by 1 prism diopter) and so forth.

Further, the optical information in the case of using the transmitted light depends on what an eyeglass wearer views, namely, depends on the "object distance (namely, objective distance)". Thus, it is also necessary to obtain the "object distance". Here, note that the "object distance" does not depend on the far vision (or farsight) power and the addition which correspond to the eyeglass wearer. Namely, the term "a long-distance place", which the eyeglass wearer views, usually designates a place at an infinite distance from the wearer. Furthermore, the term "near (or short-distance) place" designates a place at what is called a "reading distance", namely, a distance ranging from 30 to 33 cm or so. Moreover, although there is no general criterion for defining the "object distance" in visual field regions other than long-distance and short-distance places, the "object distance" in the case of such visual field regions can be calculated in a proportional distribution manner from the addition of progressive power multifocal lenses worn by the eyeglass wearer and from the surface average additional refractive power distributions thereof on the assumption that the surface average power distributions of the progressive power multifocal lenses worn by the eyeglass wearer are correct, namely, serves the purpose of wearing these eyeglass lenses.

To obtain the "object distance", first, the reciprocal (or inverse) PX (hereunder sometimes referred to as the "objective power" (in units of diopters)) of the "object distance" is found. Namely, let $D_i$, $P_n$ and $SD_i$ denote the (basic) addition (in units of diopters) of the progressive power multifocal lens, the reciprocal of the short-distance (in units of diopters) to be given and the surface average additional refractive power (in units of diopters) of the lens at a place corresponding to the "objective power" to be obtained, respectively. Thus, the "objective power" PX is obtained by $$PX = P_n \cdot SD_i / D_i$$

For example, when the basic addition of the progressive power multifocal lens is 2.00 diopters; the reciprocal of the short-distance to be given 3.00 diopters (corresponding to 33 cm); and the surface average additional refractive power of the lens at a place corresponding to the "objective power" to be obtained is 1.50 diopters, respectively, the "objective power" PX is obtained as follows:

$$PX = 3.00 \cdot 1.50 / 2.00 = 2.25 \text{ diopters.}$$

This "objective power" is equivalent to the "object distance" of about 44.4 cm.

A comparison between the "diagrams for illustrating the optical information distributions in the case of using transmitted light", which is obtained as a result of performing a calculation by using these parameters, and the "diagram for illustrating the optical information distribution on the surface" of the progressive power multifocal lens, on which the calculation is based, reveals the following matters.

In the case of the "distribution of the transmission average additional refractive power", the width W of a region, in which values of a surface average additional refractive power along a horizontal section line extending below the near vision power measuring position N are not less than one-half the addition, becomes narrower when the far vision power is positive, and the width W becomes wider when the far vision power is negative, in comparison with that in the case of the "surface average additional refractive power distribution".

Hence, the width W in the case of the positive far vision power is set in such a manner as to be wider than that in the conventional case, while the width W in the case of the negative far vision power is set in such a way as to be narrower than that in the conventional case. Thereby, the "transmission average additional refractive power distribution", which is closer to the suitable distribution serving the essential purpose, can be obtained.

Here, note that the value of the base curve of a semi-finished lens used in the case of a positive far vision power is larger than that of the base curve of a semi-finished lens used in the case of a negative far vision power, in general.

Progressive power multifocal lenses designed by taking these respects into consideration are superior in the transmission average power distribution and the transmission astigmatism distribution to the conventional lenses. As a consequence, it reveals that the designed progressive power multifocal lenses have the following properties (or characteristic features).

Namely, in the case of a progressive power multifocal lens that belongs to a group of progressive power multifocal lenses designed under a certain rule in such a manner that the fundamental elements such as the far vision power measuring position F and the near vision power measuring position N of the progressive power multifocal lens meet a common wearing object, a surface refractive power (in units of diopters) at the far vision power measuring position F is employed as a base curve ($B_i$). Further, a difference in surface refractive power between the far vision power measuring position F and the near vision power measuring position N is employed as the addition $D_i$ (in units of diopters). Furthermore, let $W(D_i, B_i)$ denote the width of a region in which values of a surface average additional refractive power along a horizontal section line extending below the near vision power measuring position N are not less than $D_i/2$.

In such a case, when arbitrary two progressive power multifocal lenses, whose additions are $D_a$ and base curves are $B_1$ and $B_2$, respectively, are extracted or selected from the group of the progressive power multifocal lenses, the following relation holds for $B_1 > B_2$:

$$W(D_a, B_1) W(D_a, B_2).$$

Moreover, it is necessary for further facilitating the progressive power multifocal lens of the present invention to determine the position of the principal fixation line on the lens in such a manner that when a single curve passing through at least both of the far vision power measuring position F and the near vision power measuring position N is assumed and named the "principal fixation line", the horizontal deviation H of an arbitrary point P on the principal fixation line towards the nose of a wearer with respect to the far vision power measuring position F is obtained by:

$$H = K \cdot D_p / D_i$$

where K is an arbitrary constant meeting the following inequality $1.0 \leq K \leq 5.0$; $D_p$ an additional surface refractive power at the point P; and $D_i$ an addition.

The purpose of increasing the additional surface refractive power along the principal fixation line is to view a nearer object. When viewing a nearer object, each of the visual lines of the left and right eyes comes nearer to the nose of a wearer (namely, the convergence action of his or her eyes is enhanced). It is, thus, necessary for meeting the convergence action to increase the deviation of the principal fixation line toward his or her nose. Consequently, the horizontal deviation H of an arbitrary point P on the principal fixation line is proportional to the value obtained by dividing the additional surface refractive power $D_p$ by the addition $D_i$. Additionally, the reason for allowing the value of the arbitrary constant K to have a permissible range is that when passing through the lens, the visual line is refracted by the prism action (or effects) of the horizontal component of the transmission refractive power of the lens at the position thereof corresponding to the deviation H, and that thus, it is preferable that when the transmission refractive power is negative, the value of the constant K decreases, and in contrast, when the transmission refractive power is positive, the value of the constant K increases. In the case that the transmission refractive power is 0, the value of the constant K is preferably 2.5 or so.

Moreover, the progressive power multifocal lenses of the present invention can be further improved by applying the following techniques to the contents of the aforementioned "design of the laterally asymmetric type" so as to make these lenses more convenient to use.

Namely, it is necessary for obtaining good binocular vision to use a lens for the right eye of a wearer and a lens for the left eye thereof, which are matched with each other in the following respects of: the astigmatism in the case of the lenses through which the visual lines of the wearer pass; the direction of what is called the axis of the astigmatism; what is called the average power of the lens (namely, the arithmetic mean of what is called the spherical power (or diopter) thereof and what is called the astigmatic power (namely, the cylindrical diopter) thereof); the horizontal component of the prism refractive power (namely, the prism diopter) thereof; and the vertical component of the prism diopter thereof.

Here, note that in the case where an object to be viewed is placed in front of the wearer, it is enough for such improvement of the progressive power multifocal lenses to take only the placement of the aforementioned principal and the distribution of the surface refractive power into consideration.

However, when the object to be viewed moves to the side of the wearer, the visual line of one of his or her eyes moves to his or her ear, whereas that of the other eye moves to his or her nose. Thus, the lenses, through which the visual lines of his or her left and right eyes pass, respectively, are not always in the same optical conditions.

If the object to be viewed is in the infinite distance from the wearer, the deviation angles of the visual lines of his or her left and right eyes at the time of changing the viewing condition from the front viewing condition to the side (or periphery) viewing condition are equal to each other. It is, therefore, preferable that the optical conditions on the lenses are (namely, the distribution of an optical characteristic quantity on the lens is) symmetry with respect to a plane which contains the aforementioned principal fixation line and is perpendicular to the section curve (for example, to the horizontal direction) and serves as a plane of mirror symmetry (incidentally, this distribution of the optical characteristic quantity on two lateral halves of the lens are not simply symmetric with (an arbitrary point on) the principal fixation line but are symmetrical with respect to the plane of mirror symmetry as seen by putting a mirror on the principal fixation line or curve including the arbitrary point P (additionally, the reason for employing such a symmetric distribution is that the "optical characteristic properties" include directional properties such as a change in the direction of what is called the axis of the astigmatism (or astigmatic difference)).

In contrast, if the object to be viewed is in the finite distance from the wearer, the visual lines of his or her left and right eyes go nearer to his or her nose by the convergence action of his or her eyes, respectively. When changing the viewing condition from the front viewing condition to the side (or periphery) viewing condition during his or her eyes are in this state, the deviation angles of the visual lines of his or her left and right eyes are equal to each other if the distance between the object and the wearer (namely, his or her eyes) is invariant. However, as can be readily understood by considering, for example, the case where the object is in the immediate vicinity of the wearer, the distance therebetween usually increases when changing the viewing condition from the front viewing condition to the side viewing condition. As a result, the convergence action of his or her eyes becomes weak and the visual lines of his or her eyes become nearly parallel.

Thus, if the object to be viewed is in the finite distance from the wearer, the deviation angles of the visual lines of his or her left and right eyes are different from each other upon changing the viewing condition from the front viewing condition to the side viewing condition. Namely, the angular deviation of the visual line moving to his or her ear is larger than that of the visual line moving to his or her nose. In the case of the spectacle lenses turning together with the head of a wearer, this tendency is further increased or enhanced owing to the turn of his or her head in the side viewing condition (incidentally, the head turns nearly a half of an angle required to change the viewing condition from the front viewing condition to the side viewing condition and moreover, his or her eyeballs turn by the remaining part of such an angle, and thus this tendency becomes noticeable. Consequently, it is preferable for viewing an object placed in the finite distance from a wearer that the optical conditions on a portion, in which the corresponding part of the principal fixation line is deviated toward his or her nose with respect to the aforementioned position F, of each lens are laterally asymmetric with a plane, which includes an arbitrary point on the principal fixation line, in the lateral (or horizontal) direction.

In the case of the progressive power multifocal lenses, the optical conditions (namely, the distributions of the optical characteristic properties) in the lateral (or horizontal) direction of an arbitrary point on the principal fixation line thereof changes usually. It is, therefore, preferable for realizing same (or similar) optical conditions (namely, the symmetric distribution of the optical characteristic property) on the two lateral half parts of the lens, through which the visual line passes, the change in the optical conditions along a horizontal section curve extending from the arbitrary point P to the nose thereof is larger than that in the optical conditions along another horizontal (or lateral) section curve extending from the point P to an ear thereof.

In summary, it is preferable that in a portion where the principal fixation line is not horizontally (or laterally) deviated from (namely, with respect to) the horizontal (or lateral) location of the far vision power measuring position F, a change in optical conditions (at least one of a change in the astigmatism along the horizontally (or laterally) sectional curve intersecting with the principal fixation line at an arbitrary point P on the principal fixation line, a change in the direction of what is called the axis of the astigmatism (or the astigmatism axis), a change in the average power thereof, a change in the horizontal component of the prism diopter (or refractive power) thereof and the vertical component of the prism diopter thereof) occurs symmetrically with respect to a plane which includes the point P and is perpendicular to the sectional curve and serves as a plane of mirror symmetry. Moreover, it is desirable that in another portion where the principal fixation line is horizontally (or laterally) deviated to the nose of a wearer from the horizontal (or lateral) location of the far vision power measuring position F, the change in the optical conditions along a horizontal (or lateral) section curve extending from the point P to the nose thereof is larger than that in the optical conditions along another horizontal (or lateral) section curve extending from the point P to an ear thereof.

Furthermore, in view of the fact that progressive power lenses having large additions (Di) become necessary with advancing age, the countermeasures against problems occurring in the case of large additions (Di) are studied in order to make the progressive power multifocal lens of the present invention more convenient to use.

Namely, those who wear spectacle lenses having relatively small additions (Di) are relatively young and thus lead active visual lives. Such wearers, accordingly, require the stability of a (dynamic) visual field at the time of moving their heads and visual lines largely. Conversely, those who wear spectacle lenses having relatively large additions (Di) are of relatively advanced age and thus lead inactive visual lives. Such a wearer, therefore, requires the stability of a (static) visual field at the time when he or her does not move his or her head and visual lines so largely. Consequently, it is preferable that the contents of the design, namely, the distributions of the astigmatism of the progressive power multifocal lens, the directions of what is called the axis of the astigmatism, the average power thereof (namely, the arithmetic mean of the spherical power (or diopter) thereof and the astigmatic power (namely, the cylindrical diopter) thereof), the horizontal component of the prism refractive power (namely, the prism diopter) thereof and the vertical component of the prism diopter thereof are changed in such a manner as to meet the aforementioned requirements.

Moreover, the results of the test independently conducted by the inventor of the present invention have revealed that there is little correlation between the limitation astigmatism in the distinct vision zone of the present invention in the case of using the far vision and the addition (Di) and that a distinct vision can be obtained or achieved if the astigmatism is within a range of about 0.75 diopters to 1.00 diopter.

Therefore, if the same design is employed correspondingly to any value of the addition (Di) similarly as in the conventional manner, the distinct vision zone in the case of using the near vision inevitably has a tendency to narrow when the addition (Di) is large. Such a tendency, however, can be decreased if the design is changed in such a way that as the addition (Di) is increased, the width W of the astigmatism, which is less than about 1.00 diopters, is increased so as to widen the distinct vision zone in the case of the near vision.

In summary, the tendency of the distinct vision zone, which is obtained by using the near vision, to narrow in the case of the large addition (Di) can be weakened if the width W(Di, X) (mm) of a zone, in which the value of the addition (Di) ranges from 0.25 to 5.00 (at least 0.75 to 3.00) diopters and the value of the astigmatism along a horizontal (or lateral) section curve including the near vision power measuring position N is not more than X (diopter), meets the following relation:

W(Da, X)>W(Db, X·Db/Da)

(incidentally, X=1.00 diopter)
in the case that the "additions" of two kinds of lenses meet the inequality Da>Db where Da and Db denote the additions (Di) of two kinds A and B of lenses, respectively. Incidentally, when the addition (Di) becomes large, the astigmatism in the side of the near portion or zone increases if the astigmatism is decreased in the near portion. Thus the static visual field becomes more stable, while the dynamic visual fields becomes instable. Namely, if a design to stabilize the dynamic visual field is applied to the progressive power multifocal lens having a relatively small "addition" and the aforementioned method is applied to the progressive power multifocal lens having relatively large "addition", the static visual field of the progressive power multifocal lens having a relatively large "addition" becomes stable and the aforesaid requirements can be simultaneously satisfied.

In the case of the lens of the present invention, the "astigmatism" may be transmission astigmatism. Further, the "average power" may be transmission average power. Moreover, the "prism refractive power" may be calculated from the deviation angles of visual lines. Incidentally, concerning only the "addition", the "additional surface refractive power" has especially been used because this is the essential definition of the "addition" (Di) used in the art. Additionally, if the conventional definition (namely, "a curve on which no surface astigmatism occurs (that is, what is called"an umbilical meridian")) of the "principal fixation line" is employed, the progressive power multifocal lens of the present invention can be realized.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 2 is a diagram for illustrating the surface average power distribution in the case of a basic design lens corresponding to Embodiment 1 of the present invention;

FIG. 4 is a diagram for illustrating the surface average power distribution in the case of a progressive power multifocal lens according to Embodiment 1 of the present invention;

FIG. 5 is a diagram for illustrating the transmission average power distribution in the case of the progressive power multifocal lens according to Embodiment 1 of the present invention;

FIG. 11 is a diagram for illustrating the transmission average power distribution in the case of the basic design lens corresponding to Embodiment 2 of the present invention;

FIG. 23 is a table for showing the tendencies of the transmission distributions relative to the surface distributions.

DETAILED DESCRIPTION OF THE PREFERRED EMBODIMENTS

Hereinafter, the preferred embodiments of the present invention will be described in detail by referring to the accompanying drawings.

Embodiment 1

Figure 1:
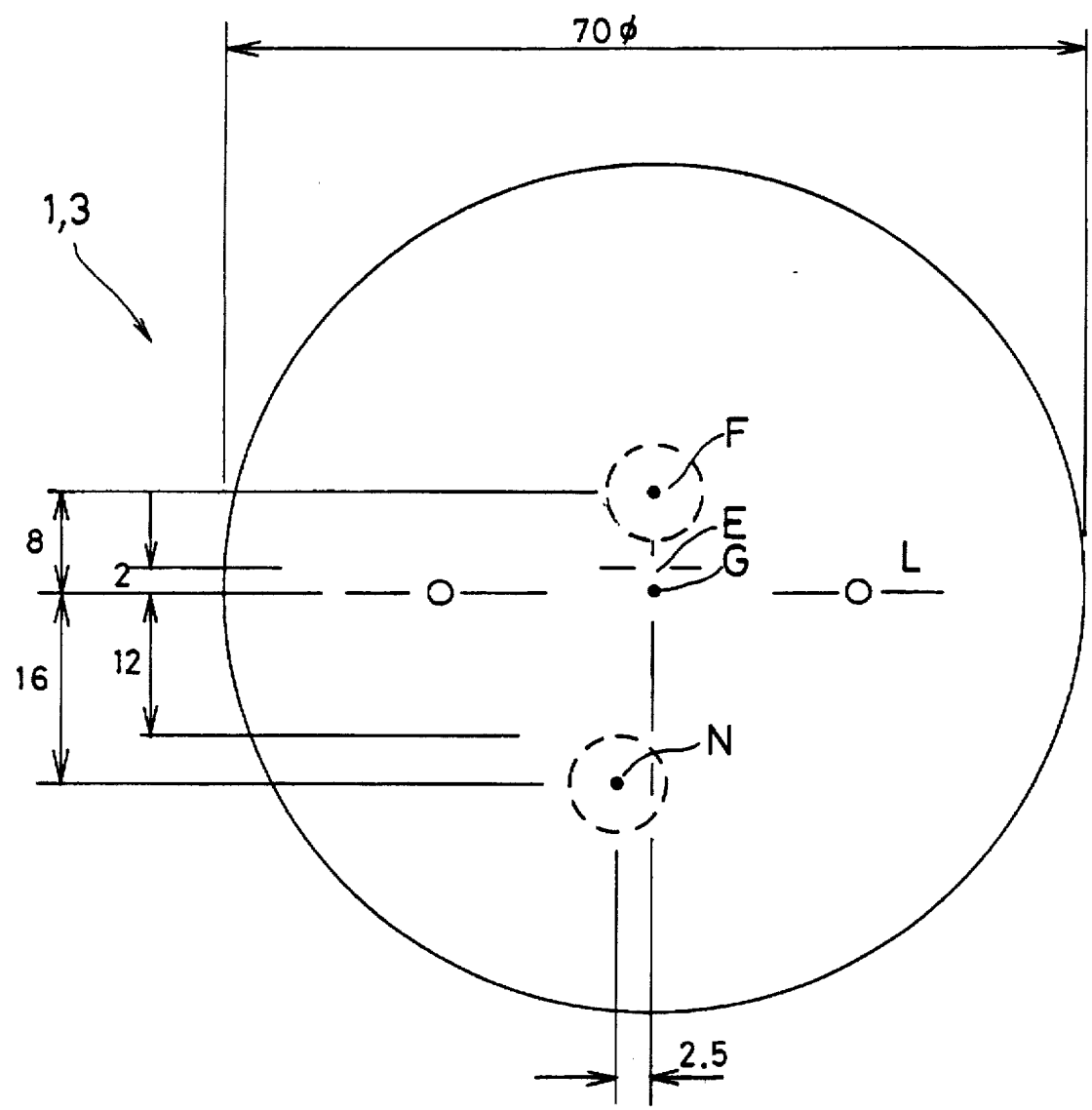
FIG. 1 is a front view of a progressive power multifocal lens 1 (which is 70 mm in diameter) for the left eye of an eyeglass wearer, according to Embodiment 1 of the present invention.

FIG. 1 illustrates a front view of a progressive power multifocal lens 1 (70 mm in diameter) for the left eye of an eyeglass wearer, according to Embodiment 1 of the present invention.

As shown in this figure, in the case of the progressive power multifocal lens 1 of this embodiment, a far vision power measuring position F is located at a place which is 8 mm upwardly away from the geometric center G thereof. Further, a near vision power measuring position N is disposed at a place which is deviated downwardly from this geometric center G by a distance of 16 mm and also deviated therefrom laterally towards the nose of a wearer by a distance of 2.5 mm. Moreover, a position E, through which a visual line of the eyeglass wearer passes when his or her eyes are in a frontal vision condition (namely, in a front viewing condition), is located at a place which is 2 mm upwardly away from the geometric center G.

Incidentally, in the case of this embodiment, the refractive power in the case of using the far vision is S-5.50 diopters; the addition (ADD) +2.00 diopters; and an employed base curve 2 diopters. Further, diethylene-glycol-bisallyl-carbonate is employed as the material of the lens, and the refractive index (nd) thereof is 1.499.

Figure 8:
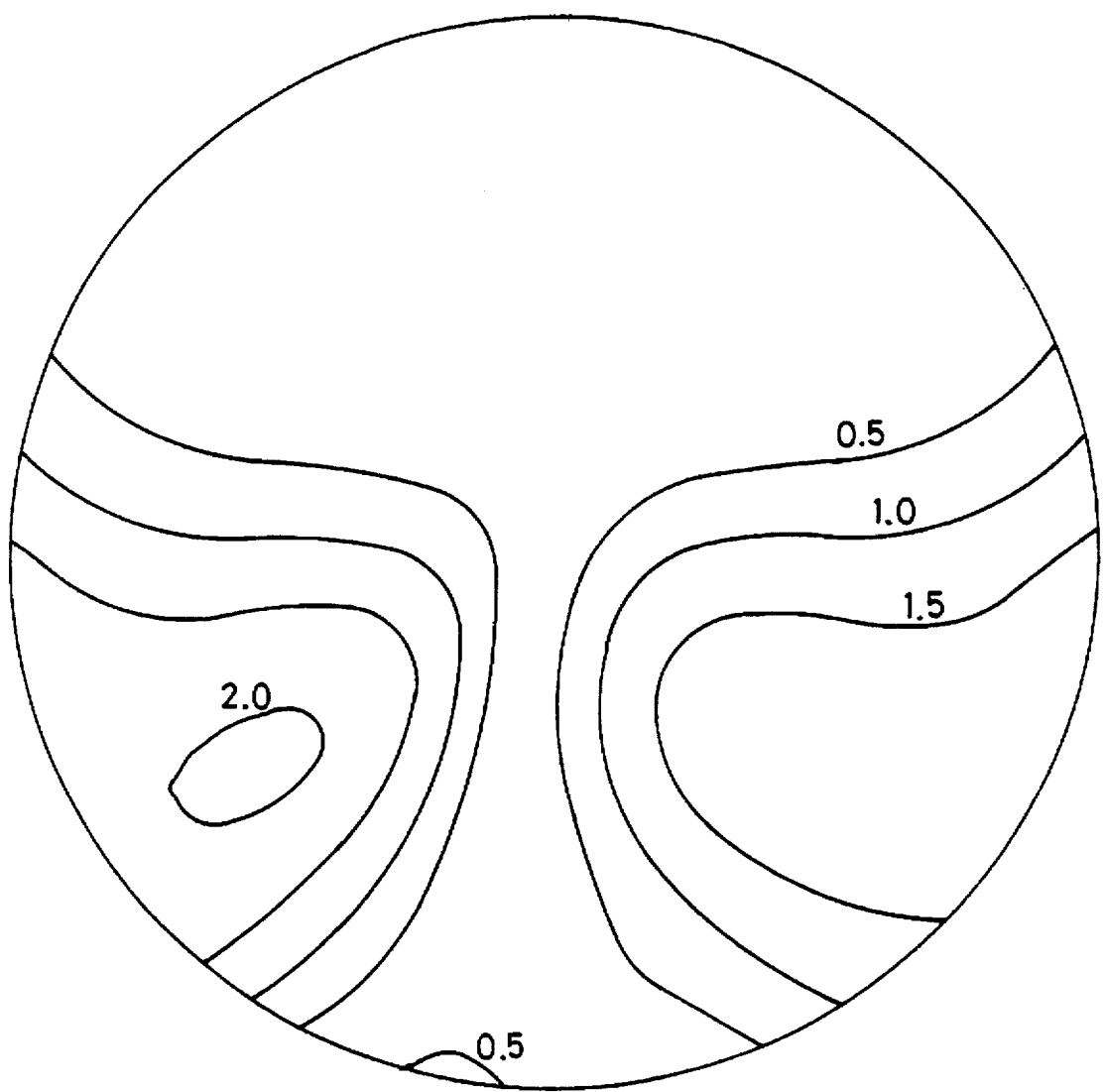
FIG. 8 is a diagram for illustrating the surface astigmatism distribution in the case of the progressive power multifocal lens according to Embodiment 1 of the present invention.

FIG. 4 is a diagram for illustrating the surface average power distribution in the case of a progressive power multifocal lens according to Embodiment 1 of the present invention. Further, FIG. 8 is a diagram for illustrating the surface astigmatism distribution in the case of the progressive power multifocal lens according to Embodiment 1 of the present invention.

The progressive power multifocal lens having such distributions is designed as follows.

Namely, first, optical information on the lens surface is represented in distribution-diagram form by using conventional techniques. Then, it is studied whether or not such distributions are best suited to the eyeglass wearer. A lens having optimum "surface average power distribution" and "surface astigmatism distribution" is obtained on the basis of a result of the study as a basic design lens.

Figure 6:
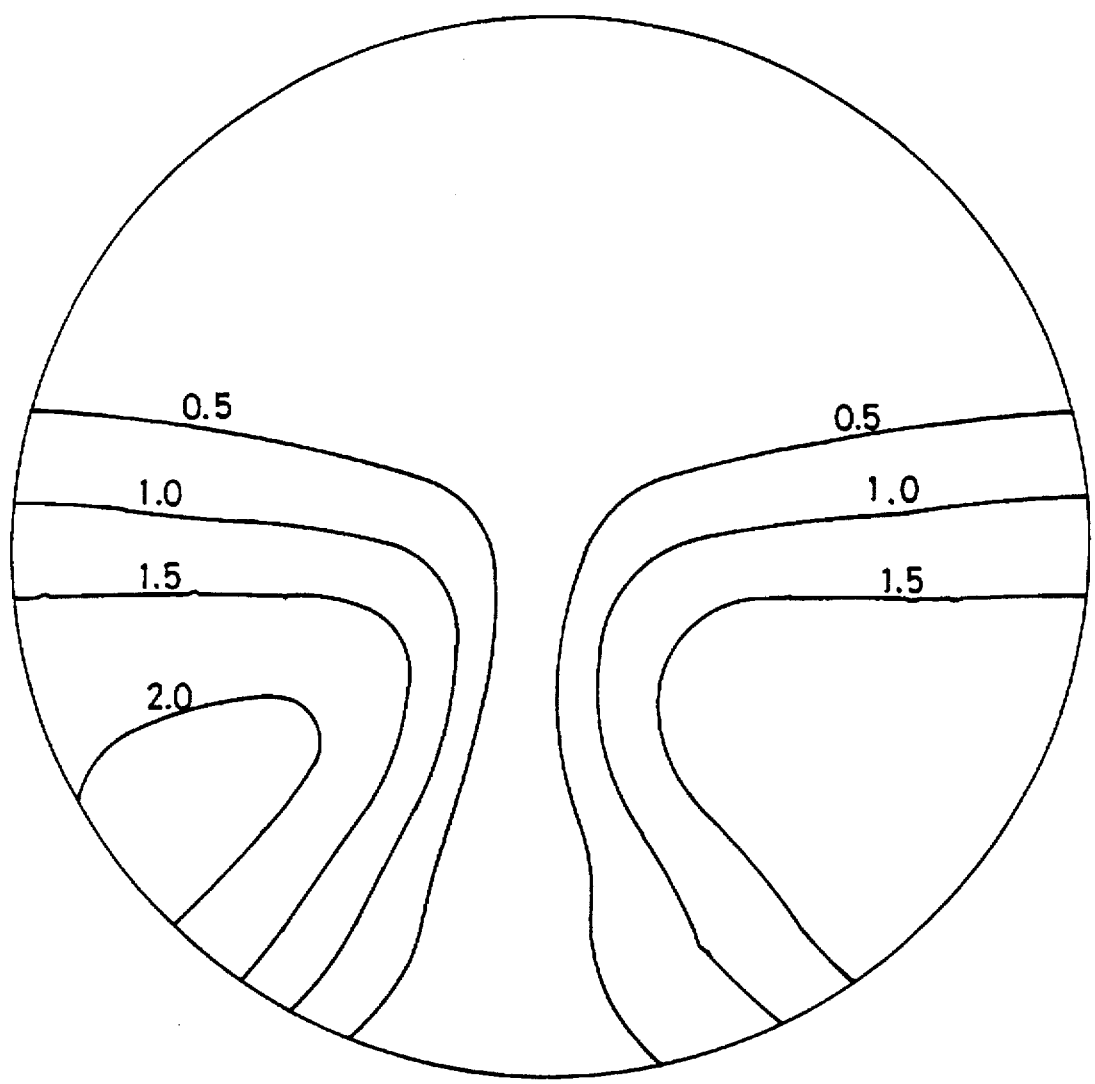
FIG. 6 is a diagram for illustrating the surface astigmatism distribution in the case of the basic design lens corresponding to Embodiment 1 of the present invention.

FIG. 2 is a diagram for illustrating the surface average power distribution in the case of the basic design lens corresponding to Embodiment 1 of the present invention. FIG. 6 is a diagram for illustrating the surface astigmatism distribution in the case of the basic design lens corresponding to Embodiment 1 of the present invention. Incidentally, in the diagram of FIG. 2 for illustrating the average power, "contour lines" are respectively drawn correspondingly to the values of the average power, which are determined at intervals of 0.5 diopters. Further, in the diagram of FIG. 6 for illustrating the astigmatism, "contour lines" are respectively drawn correspondingly to the values of the astigmatism, which are determined at intervals of 0.5 diopters. These "contour lines" are drawn in common in each of distribution diagrams which will be described hereinbelow.

Next, the "transmission average power distribution" and the "transmission astigmatism distribution" of the basic design lens are obtained by calculation from the surface average power distribution and the surface astigmatism distribution, which are obtained in this way. Actually, this calculation is performed by running a simulation of the power and astigmatism of the spectacle lens, through which light rays are incident on an eye of a wearer, through the use of three-dimensional ray tracing by taking all of the aforementioned factors into consideration.

Figure 3:
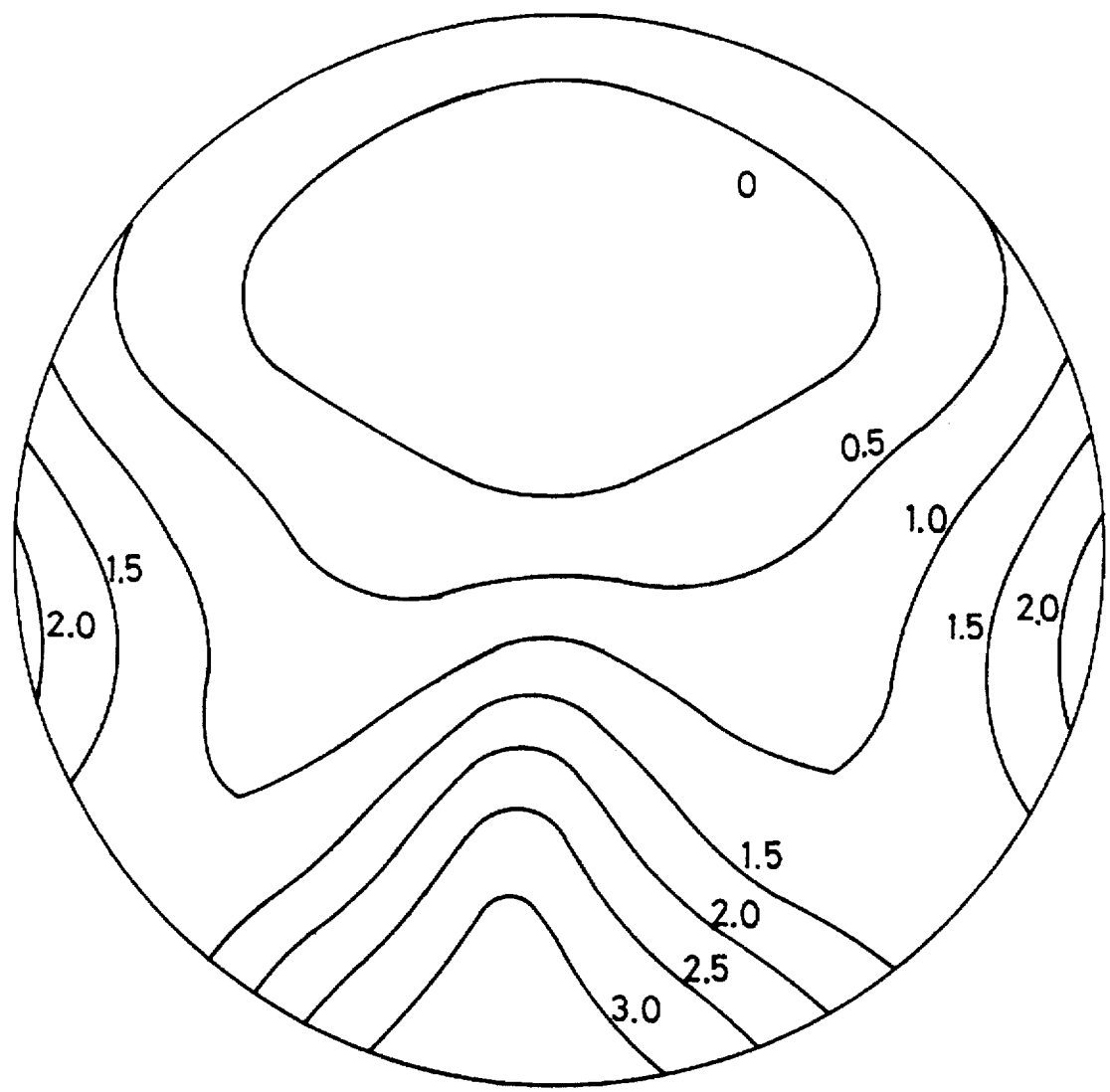
FIG. 3 is a diagram for illustrating the transmission average power distribution in the case of the basic design lens corresponding to Embodiment 1 of the present invention.

FIG. 3 is a diagram for illustrating the transmission average power distribution in the case of the basic design lens corresponding to Embodiment 1 of the present invention. Further, FIG. 7 is a diagram for illustrating the transmission astigmatism distribution in the case of the basic design lens corresponding to Embodiment 1 of the present invention;

As is seen from the comparison between the surface-average-power distribution diagram of FIG. 2 and the transmission-average-power distribution diagram of FIG. 3, the average power of, especially, the near vision viewing portion (namely, the reading portion) increases extraordinarily in a transmission state.

Figure 7:
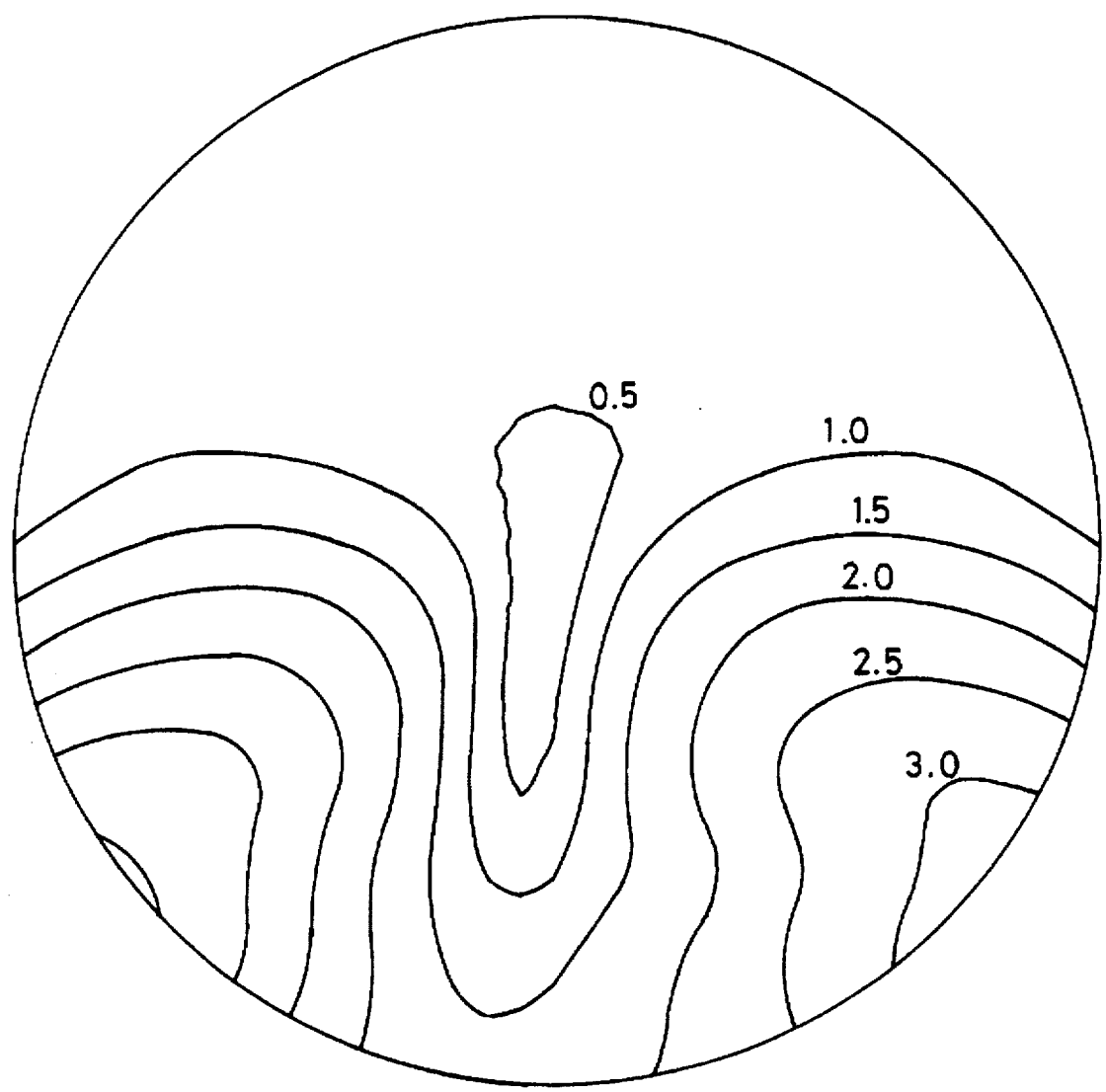
FIG. 7 is a diagram for illustrating the transmission astigmatism distribution in the case of the basic design lens corresponding to Embodiment 1 of the present invention.

Similarly, as is seen from the comparison between the surface astigmatism distribution diagram of FIG. 6 and the transmission astigmatism distribution diagram of FIG. 7, the aberration of, especially, the near vision viewing portion increases in the case of FIG. 7, in comparison with the case of FIG. 6.

As a consequence, it is found that although the basic design lens is superior in the surface average power distribution and the good surface astigmatism distribution, the basic design lens is rather inferior in the transmission average power distribution and the transmission astigmatism distribution that actually affects the feeling of a wearer at the time when he or she wears the lens.

It is sufficient for causing the most comfortable feeling of an eyeglass wearer, which is the originally intended purpose of the basic design lens, to establish the lens so that the transmission average power distribution and the transmission astigmatism thereof themselves become closer to the surface average power distribution and the surface astigmatism distribution, respectively, as much as possible.

Thus, in the case of this embodiment, in view of the fact that the far vision power is negative, the improvement of the design is repeated by try and error in such a manner that the width W (namely, the width of a region in which values of a surface average additional refractive power along a horizontal section line extending below the near vision power measuring position N are not less than half of the addition) in the case of the progressive power multifocal lens of Embodiment 1 becomes narrower than the width W in the case of the basic design lens. Further, the transmission average power distribution and the transmission astigmatism distribution of each of trial lenses are obtained by calculation. Among such trial lenses, a progressive power multifocal lens, the obtained transmission average power distribution and the obtained transmission astigmatism of which are closest to the surface average power distribution and the surface astigmatism distribution of the basic design lens, respectively, is employed as that of Embodiment 1. Incidentally, the repetition of the design is practically performed by making full use of optimization techniques utilizing a computer.

Figure 9:
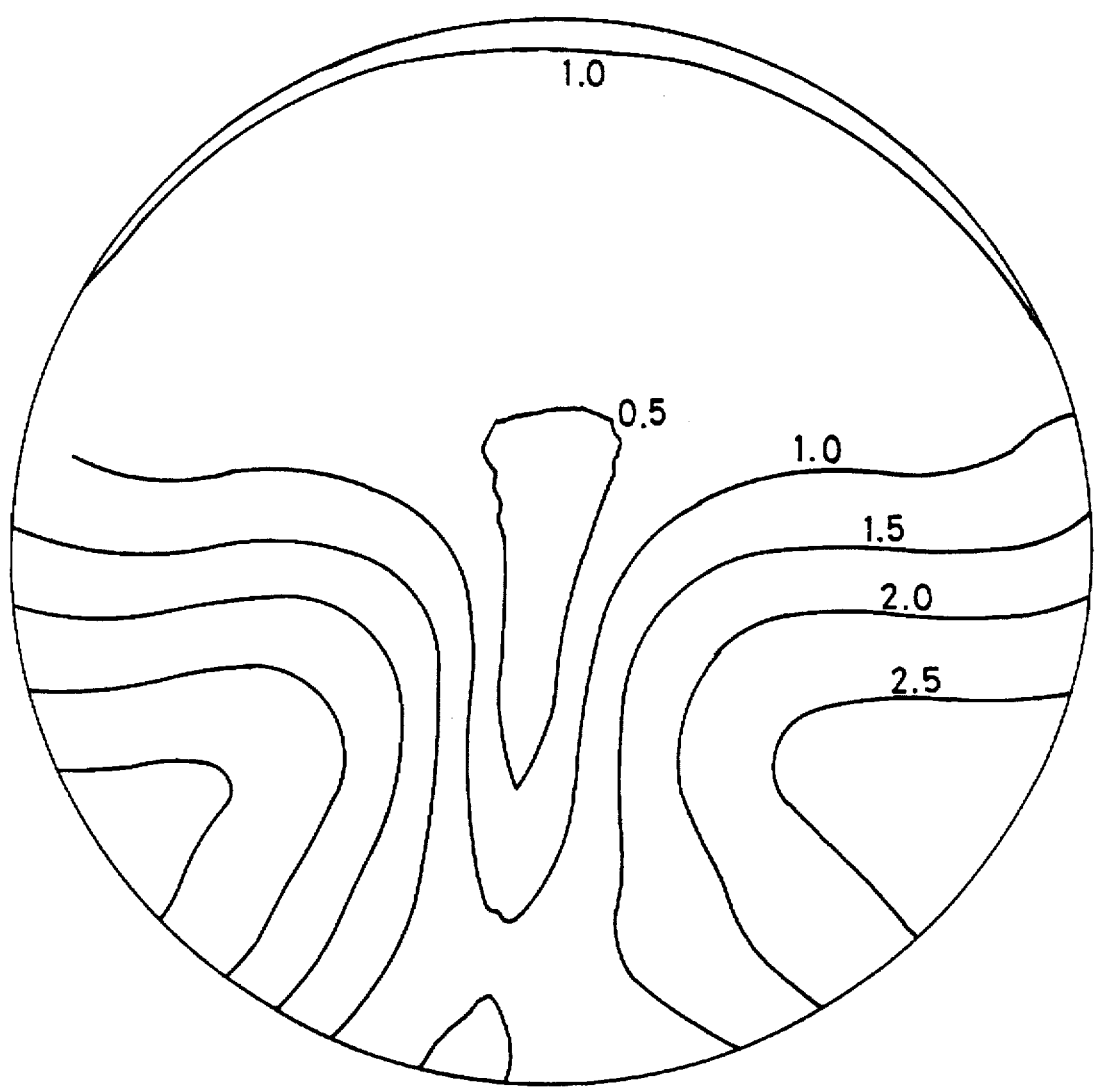
FIG. 9 is a diagram for illustrating the transmission astigmatism distribution in the case of the progressive power multifocal lens according to Embodiment 1 of the present invention.

FIG. 5 is a diagram for illustrating the transmission average power distribution in the case of Embodiment 1 of the present invention. FIG. 9 is a diagram for illustrating the transmission astigmatism distribution in the case of Embodiment 1 of the present invention. As is clear from the comparisons among these figures and FIGS. 3 and 7, regarding the power distribution, the average power in the case of the transmission average power distribution of Embodiment 1 (especially, the average power in the near vision portion (namely, the reading portion)) is low in comparison with the case of the transmission average power distribution of the basic design lens. Thus, the transmission average power distribution of Embodiment 1 becomes close to the corresponding target distribution, namely, the surface average power distribution of the basic design lens of FIG. 2, and is, therefore, improved.

Further, regarding the astigmatism distribution the aberration in the case of the transmission astigmatism distribution of Embodiment 1 (especially, the astigmatism in the near vision portion (namely, the reading portion)) is low in comparison with the case of the transmission astigmatism distribution of the basic design lens. Thus, the transmission astigmatism distribution of Embodiment 1 becomes close to the corresponding target distribution, namely, the surface astigmatism distribution of the basic design lens of FIG. 6, and is, therefore, improved.

As a consequence, taking various factors into account, it is found that the progressive power multifocal lens of Embodiment 1 is superior to the basic design lens.

Embodiment 2

A lens 3 of Embodiment 2 of the present invention is also designed according to the same lens design method applied to the progressive power multifocal lens of Embodiment 1 as illustrated in FIG. 1, and further uses the same material as of the lens of Embodiment 1 of the present invention. The lens 3 of Embodiment 2 is different from the lens of Embodiment 1 in that in the case of this Embodiment 2, the refractive power in the case of using the far vision is set at S+4.50 diopters; the addition (ADD) at +2.00 diopters; and an employed base curve at 7 diopters.

Figure 12:
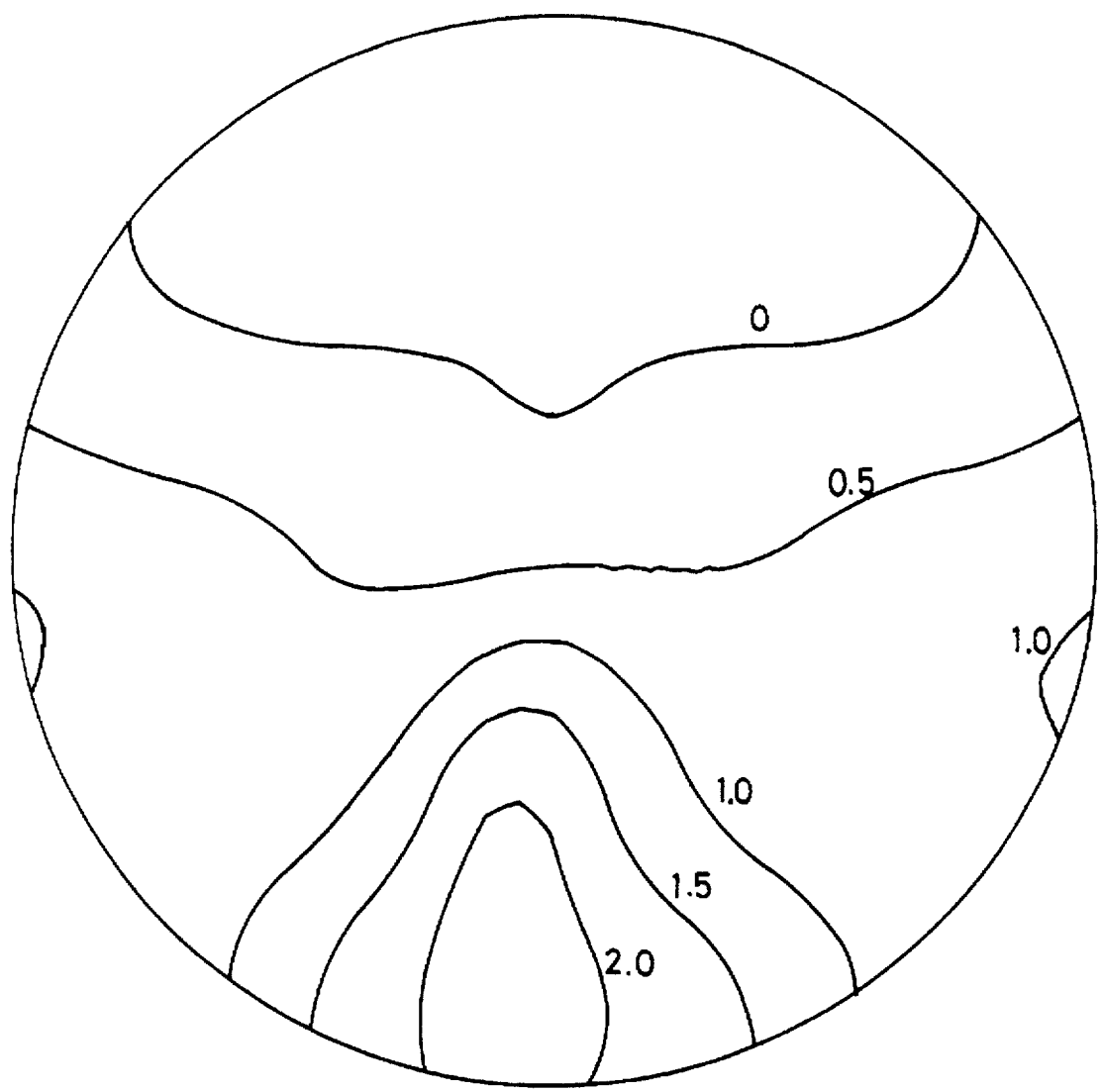
FIG. 12 is a diagram for illustrating the surface average power distribution in the case of a progressive power multifocal lens according to Embodiment 2 of the present invention.
Figure 16:
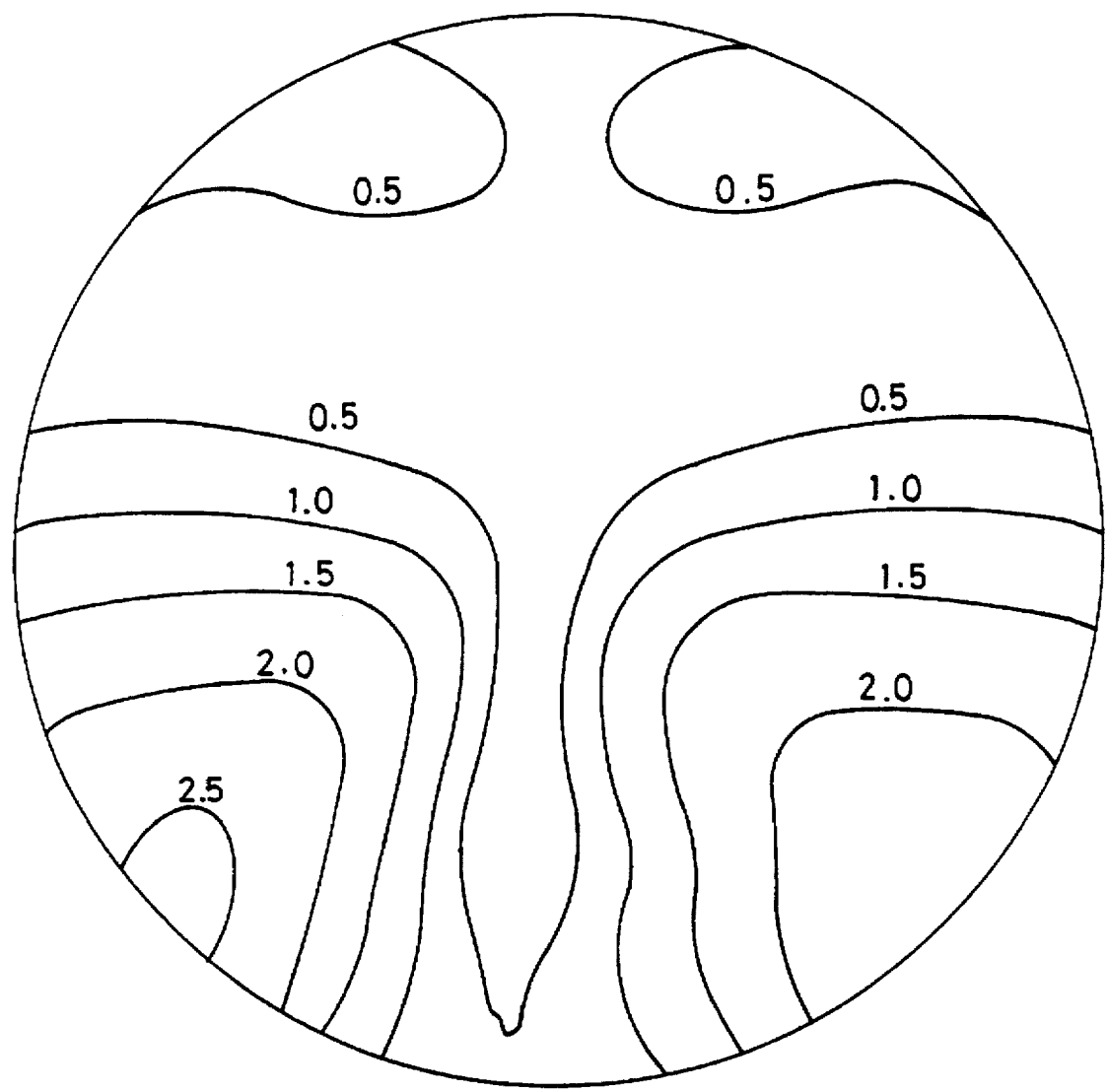
FIG. 16 is a diagram for illustrating the surface astigmatism distribution in the case of the progressive power multifocal lens according to Embodiment 2 of the present invention.

FIG. 12 is a diagram for illustrating the surface average power distribution in the case of a progressive power multifocal lens according to Embodiment 2 of the present invention. Further, FIG. 16 is a diagram for illustrating the surface astigmatism distribution in the case of the progressive power multifocal lens according to Embodiment 2 of the present invention.

This progressive power multifocal lens of Embodiment 2 of the present invention is obtained by first determining a basic design lens and then performing the improvement of the design on the basis of the basic design lens, similarly as of Embodiment 1 of the present invention.

Figure 10:
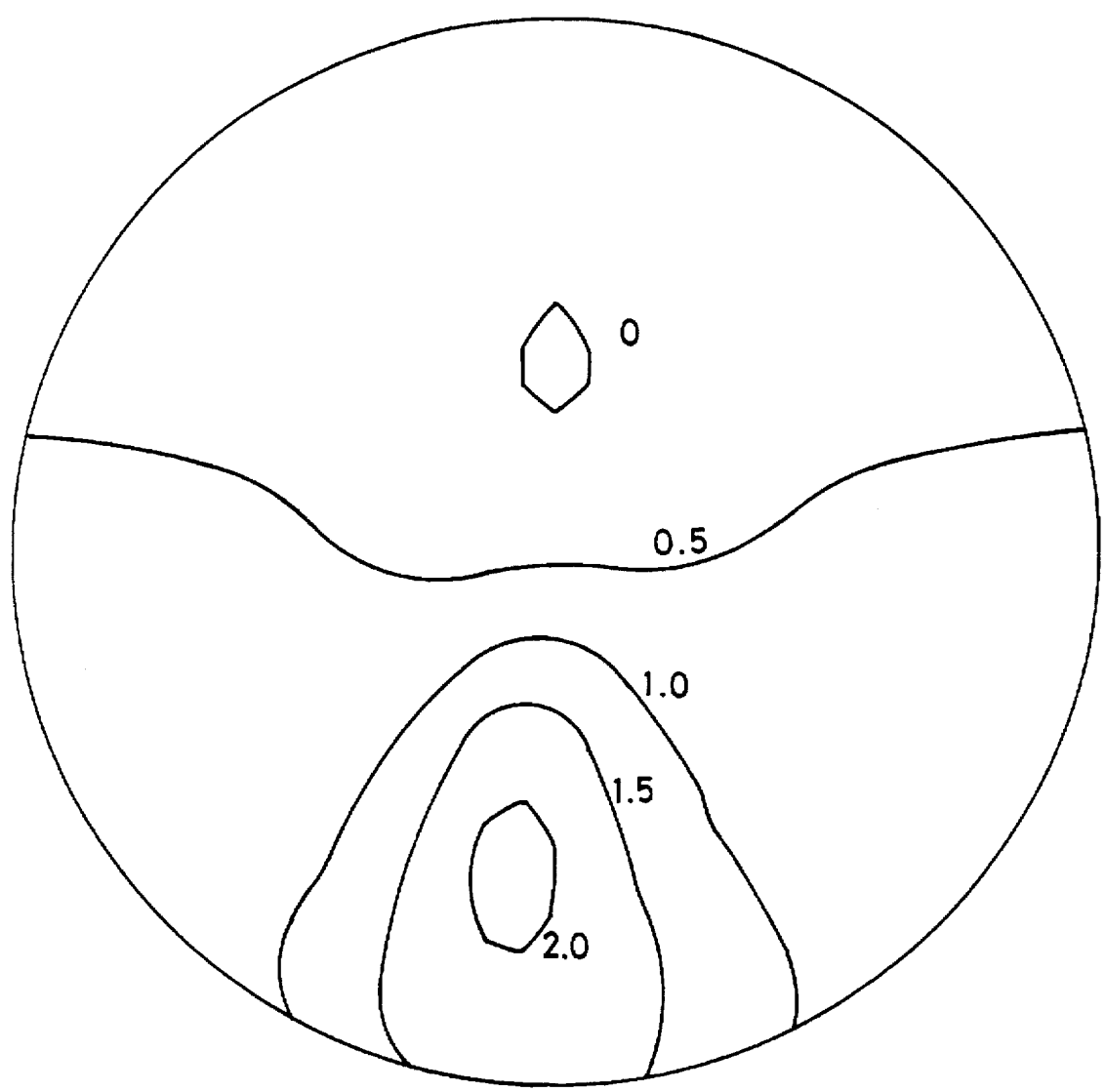
FIG. 10 is a diagram for illustrating the surface average power distribution in the case of a basic design lens corresponding to Embodiment 2 of the present invention.
Figure 14:
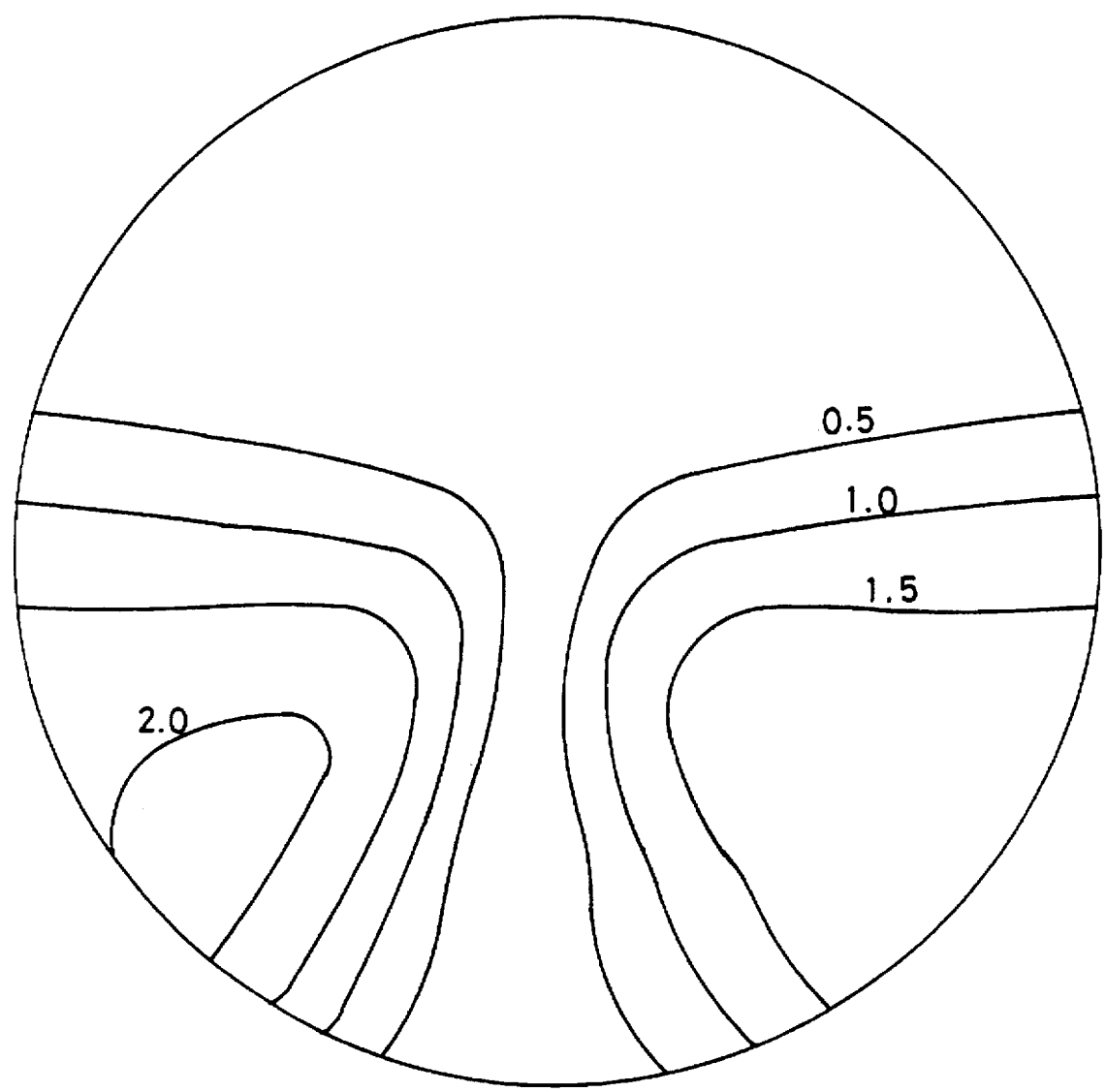
FIG. 14 is a diagram for illustrating the surface astigmatism distribution in the case of the basic design lens corresponding to Embodiment 2 of the present invention.
Figure 15:
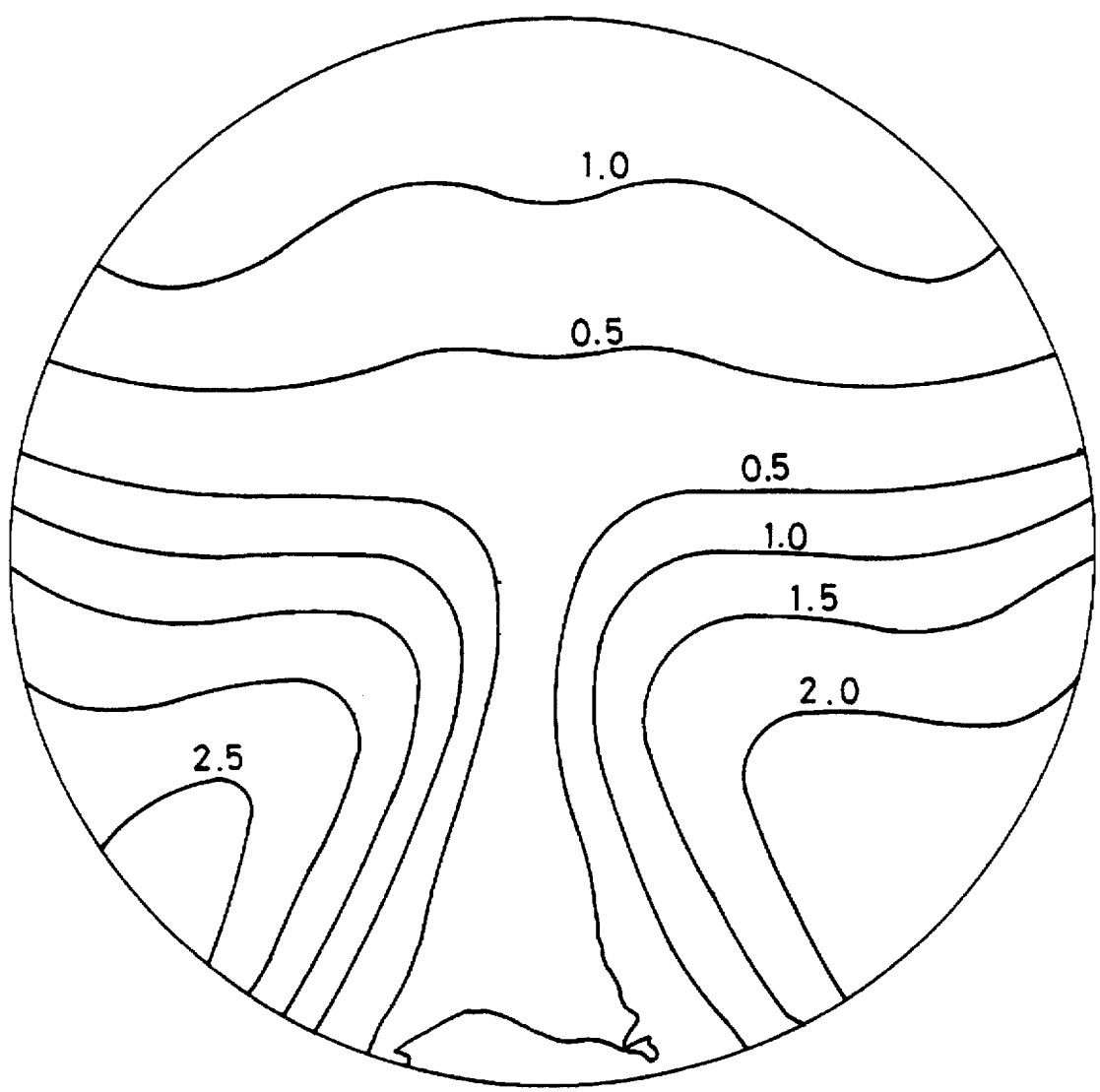
FIG. 15 is a diagram for illustrating the transmission astigmatism distribution in the case of the basic design lens corresponding to Embodiment 2 of the present invention.

FIG. 10 is a diagram for illustrating the surface average power distribution in the case of the basic design lens corresponding to Embodiment 2 of the present invention. Further, FIG. 11 is a diagram for illustrating the transmission average power distribution in the case of the basic design lens corresponding to Embodiment 2 of the present invention. Moreover, FIG. 14 is a diagram for illustrating the surface astigmatism distribution in the case of the basic design lens corresponding to Embodiment 2 of the present invention. Furthermore, FIG. 15 is a diagram for illustrating the transmission astigmatism distribution in the case of the basic design lens corresponding to Embodiment 2 of the present invention.

Figure 13:
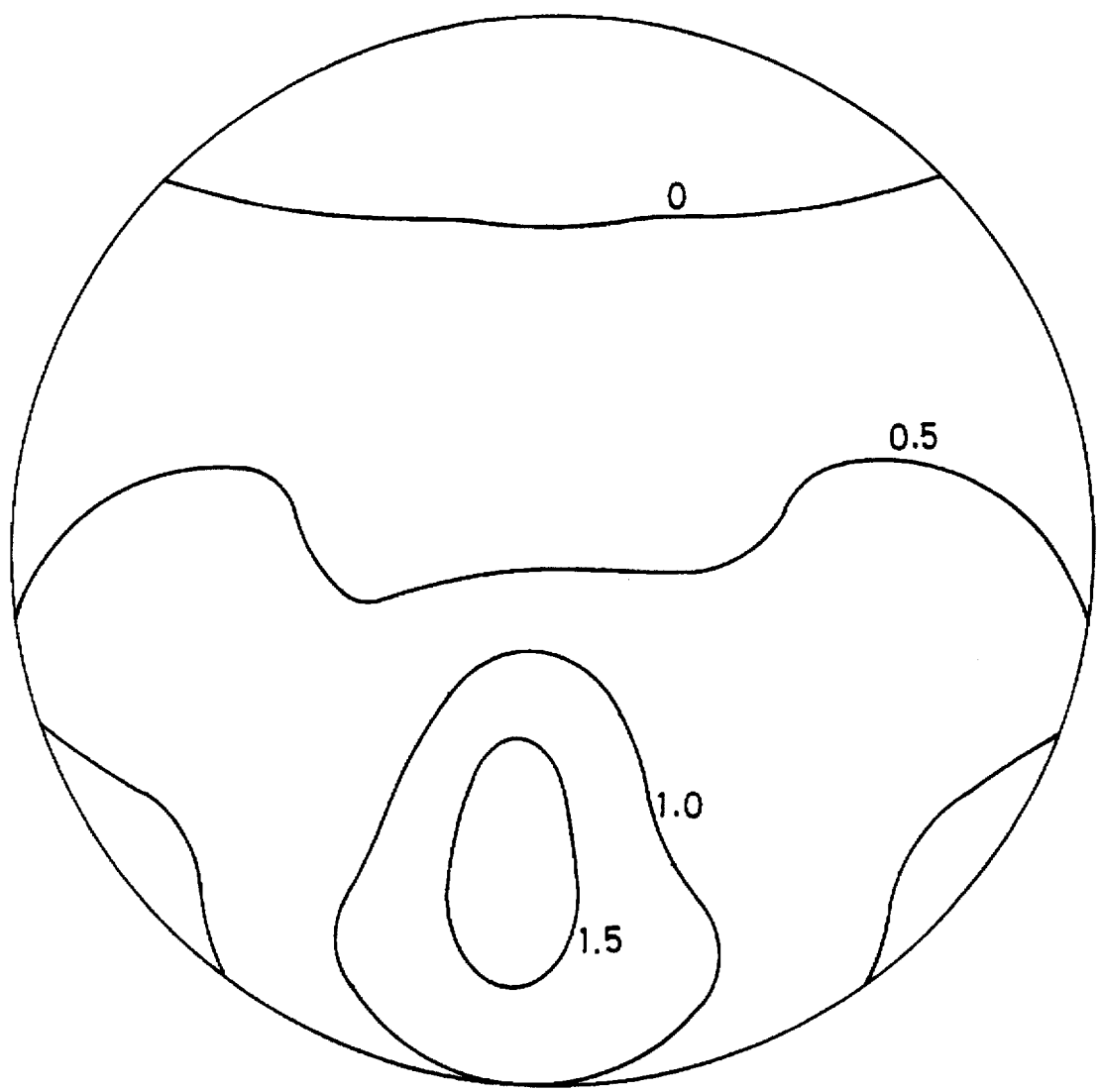
FIG. 13 is a diagram for illustrating the transmission average power distribution in the case of the progressive power multifocal lens according to Embodiment 2 of the present invention.
Figure 17:
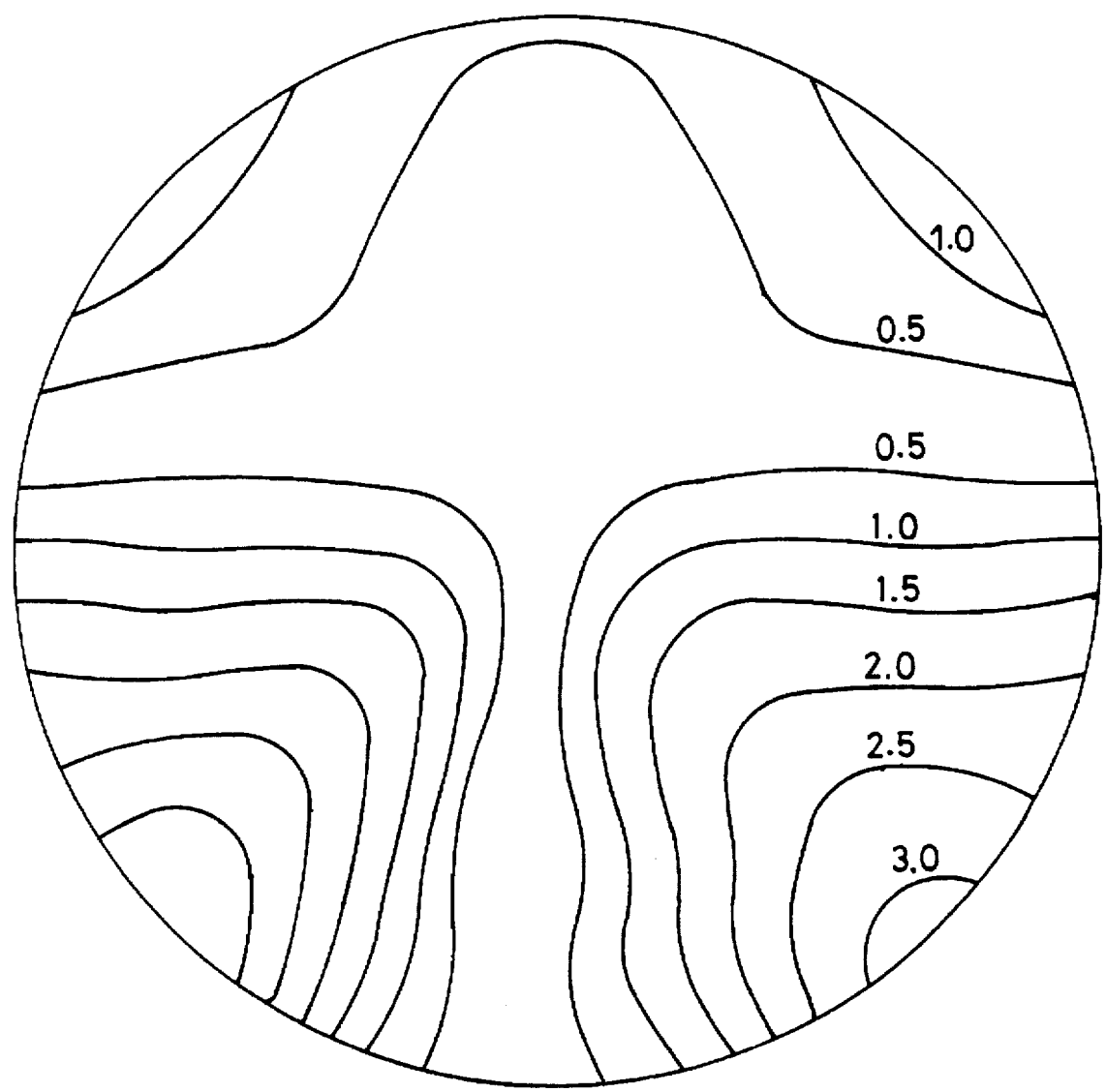
FIG. 17 is a diagram for illustrating the transmission astigmatism distribution in the case of the progressive power multifocal lens according to Embodiment 2 of the present invention.

In contrast with this, FIG. 13 is a diagram for illustrating the transmission average power distribution in the case of Embodiment 2 of the present invention. Further, FIG. 17 is a diagram for illustrating the transmission astigmatism distribution in the case of Embodiment 2 of the present invention.

As is obvious from the comparisons among these figures, regarding the power distribution, the average power in the case of the transmission average power distribution of Embodiment 2 (especially, the average power in the near vision portion (namely, the reading portion)) increases, in comparison with the case of the transmission average power distribution of the basic design lens. Thus, the transmission average power distribution of Embodiment 2 becomes close to the corresponding target distribution, namely, the surface average power distribution of the basic design lens of FIG. 10, and is, therefore, improved. Further, regarding the astigmatism distribution, the aberration in the case of the transmission astigmatism distribution of Embodiment 2 (especially, the astigmatism in the far vision portion) decreases in comparison with the case of the transmission astigmatism distribution of the basic design lens. It is, thus, found that the transmission astigmatism distribution of Embodiment 2 becomes close to the corresponding target distribution, namely, the surface astigmatism distribution of the basic design lens of FIG. 14, and is, therefore, improved.

Embodiment 3

Figure 18:
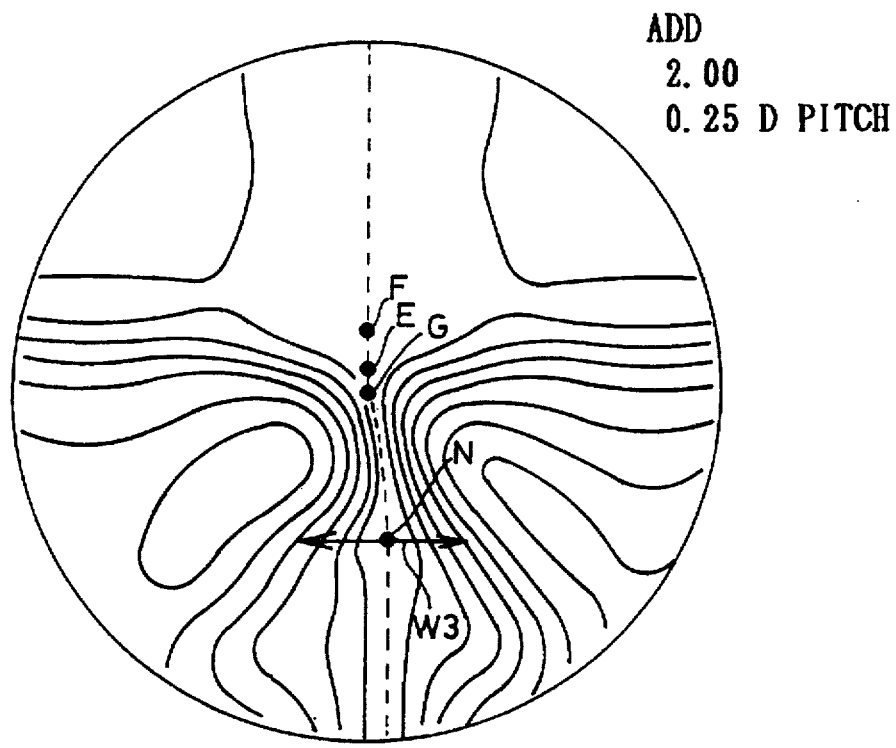
FIG. 18 is a diagram for illustrating the surface astigmatism distribution in the case of a progressive power multifocal lens according to another embodiment of the present invention.
Figure 19:
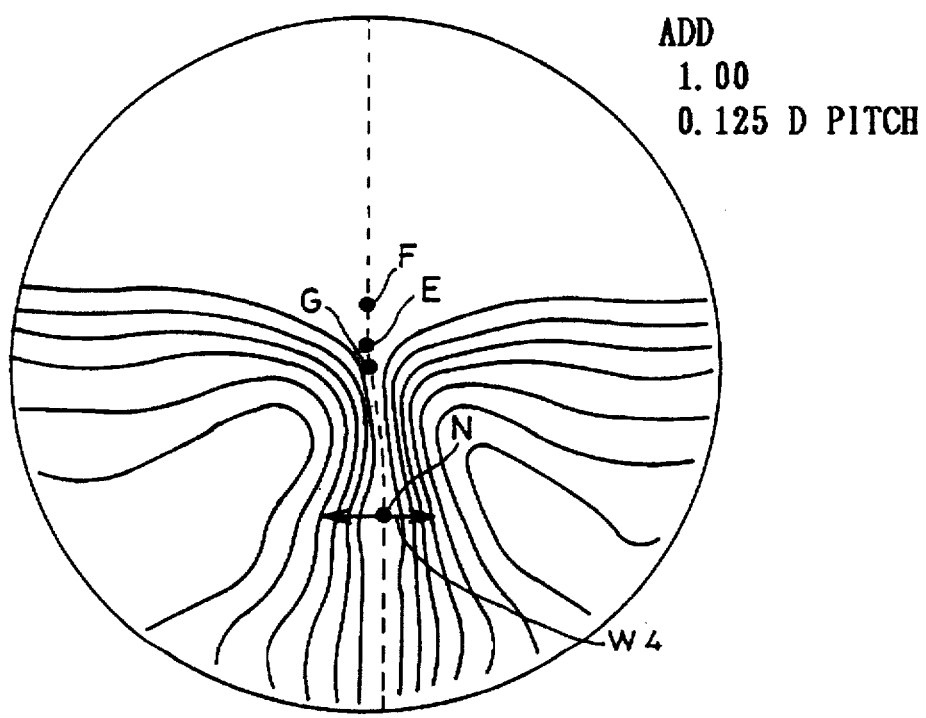
FIG. 19 is a diagram for illustrating the surface astigmatism distribution in the case of a progressive power multifocal lens according to still another embodiment of the present invention.

FIGS. 18 and 19 are diagrams respectively illustrating the surface astigmatism distributions in the cases of progressive power multifocal lenses according to other embodiments of the present invention. Incidentally, these embodiments employ the same design techniques as employed in Embodiment 1 and Embodiment 2. The description of the common parts is omitted for simplicity of description.

The embodiments of FIGS. 18 and 19 are different from Embodiment 1 and Embodiment 2 in that the embodiments of FIGS. 18 and 19 are lenses having the far vision power of 0.00 diopter and that the addition (ADD) of the embodiment of FIG. 18 is +2.00 diopters, and the addition (ADD) of the embodiment of FIG. 19 is +1.00 diopter, and the distribution of FIG. 18 is shown by using "contour lines" respectively drawn correspondingly to the values of the astigmatism, which are determined at intervals of 0.25 diopters, and the distribution of FIG. 19 is shown by using "contour lines" respectively drawn correspondingly to the values of the astigmatism, which are determined at intervals of 0.125 diopters. The placement of positions F, E and N described in FIGS. 18 and 19 is the same as in the cases of Embodiment 1 and Embodiment 2. Further, a single curve (represented by a dotted or dashed line) extending in a nearly central portion of each of FIGS. 18 and 19 from top to bottom thereof as viewed in each of these figures is a principal (or main) fixation line and passes through the three positions F, E and N.

Further, in a region (illustrated as being laying higher or above the position F in each of these figures) in which the principal fixation line is not deviated in the horizontal (or lateral) direction from the far vision power measuring position F, the spacings between the contour lines are laterally (or horizontally) symmetric with respect to a plane of mirror symmetry. Moreover, in another region (illustrated as being laying lower or below the position F in each of these figures) in which the principal fixation line is deviated to the nose of a wearer from the position F, the contour lines are dense in the "nose-side part (namely, the right-side part as viewed in each of these figures)" but are sparse in the "ear-side part (namely, the left-side part as viewed therein)". Thus, the change in the astigmatism along the part extending from the principal fixation line to the nose of the wearer is larger than the change in the astigmatism along the part extending from the principal fixation line to the ear thereof. This feature or tendency holds true not only for the astigmatism, but also for the direction of what is called the axis of the astigmatic of the lens, the average refractive power thereof, the horizontal component of the prism refractive power (namely, the prism diopter) thereof and the vertical component of the prism diopter thereof.

Here, in the case of the progressive power multifocal lens, which has the same base curve and the addition of Di diopters, let W(Di, X) (mm) represent a width of a region in which the values of astigmatism along the horizontal section curve passing through the near vision power measuring position N are not more than X.

In this case, when arbitrary two progressive power multifocal lenses, whose additions are Da and Db (diopters), respectively, and base curves are the same with each other, are selected from the group of the progressive power multifocal lenses, the following relation holds for the addition Da>Db:

W(Da, X)>W(Db, X·Db/Da).

where X=1.00 diopter. In connection with this relation, the widths W in the cases of the progressive power multifocal lenses of FIGS. 18 and 19 are compared with each other, and it is studied whether or not this relation is satisfied.

Thus, the width W3 of the near vision portion (namely, the reading portion) in the case of FIG. 18 is obtained as follows:

W3=W(2.00, 1.00).

Further, the width W4 of the near vision portion (namely, the reading portion) in the case of FIG. 19 is obtained as follows:

W4=W(1.00, 0.5).

If the design of the lens of FIG. 18 is the same as that of the lens of FIG. 19, the astigmatism distribution of the lens of FIG. 18 should be equivalent to that of a doublet consisting of two lenses of FIG. 19, because the addition of the lens of FIG. 18 is twice as much as the addition of the lens of FIG. 19.

Namely, the width (W4) in the case of FIG. 19, in which the addition (Di) is +1.00 diopter and the astigmatism (X) is 0.50 diopters, should be equal to the width (W3) in the case of FIG. 18, in which the addition (Di) is +2.00 diopters and the astigmatism (X) is 1.00 diopter.

However, the comparison between the widths of two arrows, which are respectively indicated in FIGS. 18 and 19 and pass through the positions N of the lenses of FIGS. 18 and 19, reveals that W3>W4, namely, W(2.00, 1.00)W(1.00, 0.50), that the aforementioned relation is satisfied and that such a design decelerates a tendency for the distinct vision area in the case of using the near vision to decrease when the addition is increased. Relation between Lenses of Embodiment 1 and Embodiment 2

Next, the relation between the lenses of Embodiment 1 and Embodiment 2 will be verified hereinbelow.

Figure 20:
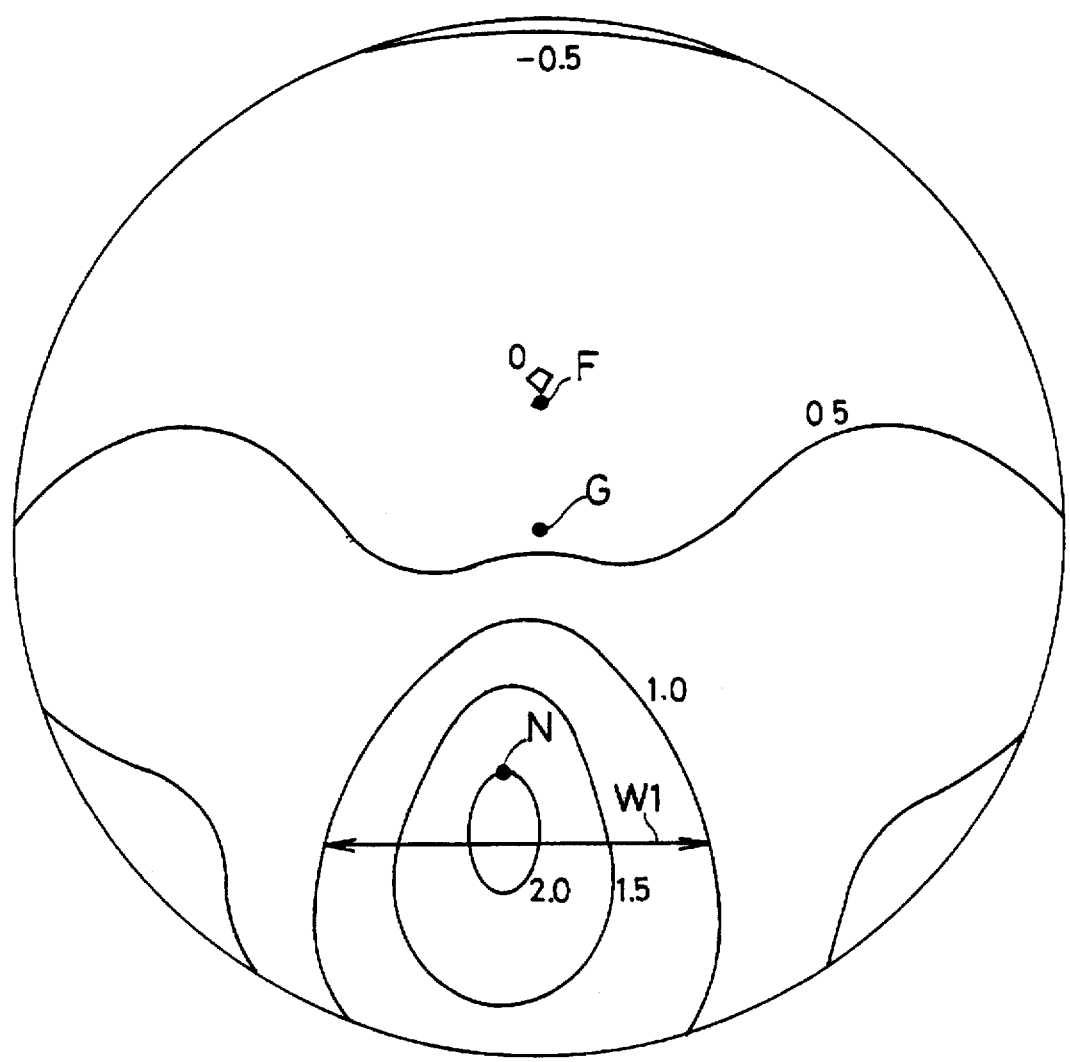
FIG. 20 is a diagram for indicating the width W1 of a region, in which values of a surface average additional refractive power along a horizontal section line extending below the near vision power measuring position N are not less than Di/2, in the diagram illustrating the surface average power distribution of the progressive power multifocal lens according to Embodiment 1 of FIG. 4.
Figure 21:
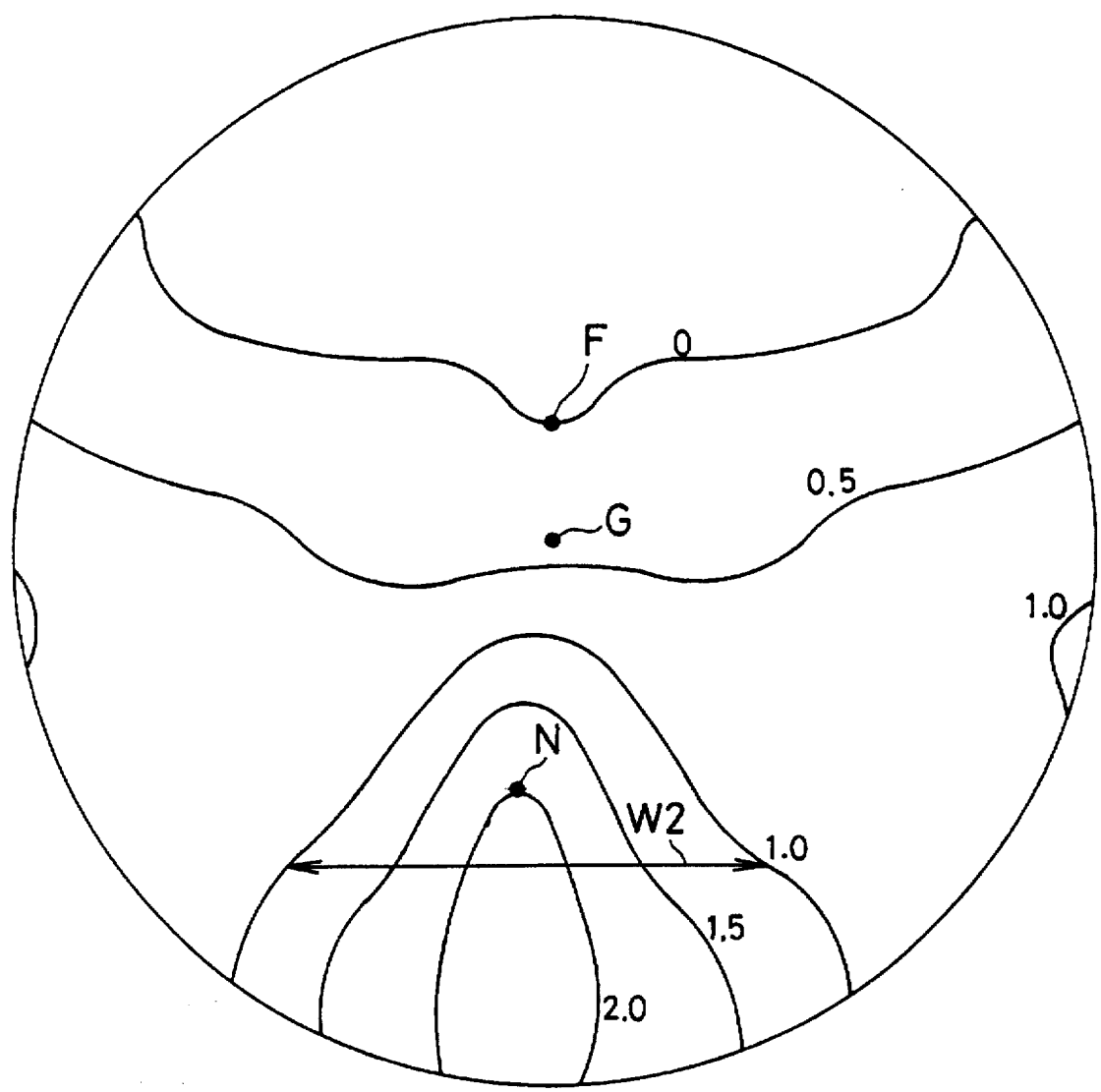
FIG. 21 is a diagram for indicating the width W2 of a region, in which values of a surface average additional refractive power along a horizontal section line extending below the near vision power measuring position N are not less than Di/2, in the diagram illustrating the surface average power distribution of the progressive power multifocal lens according to Embodiment 2 of FIG. 12.
Figure 22:
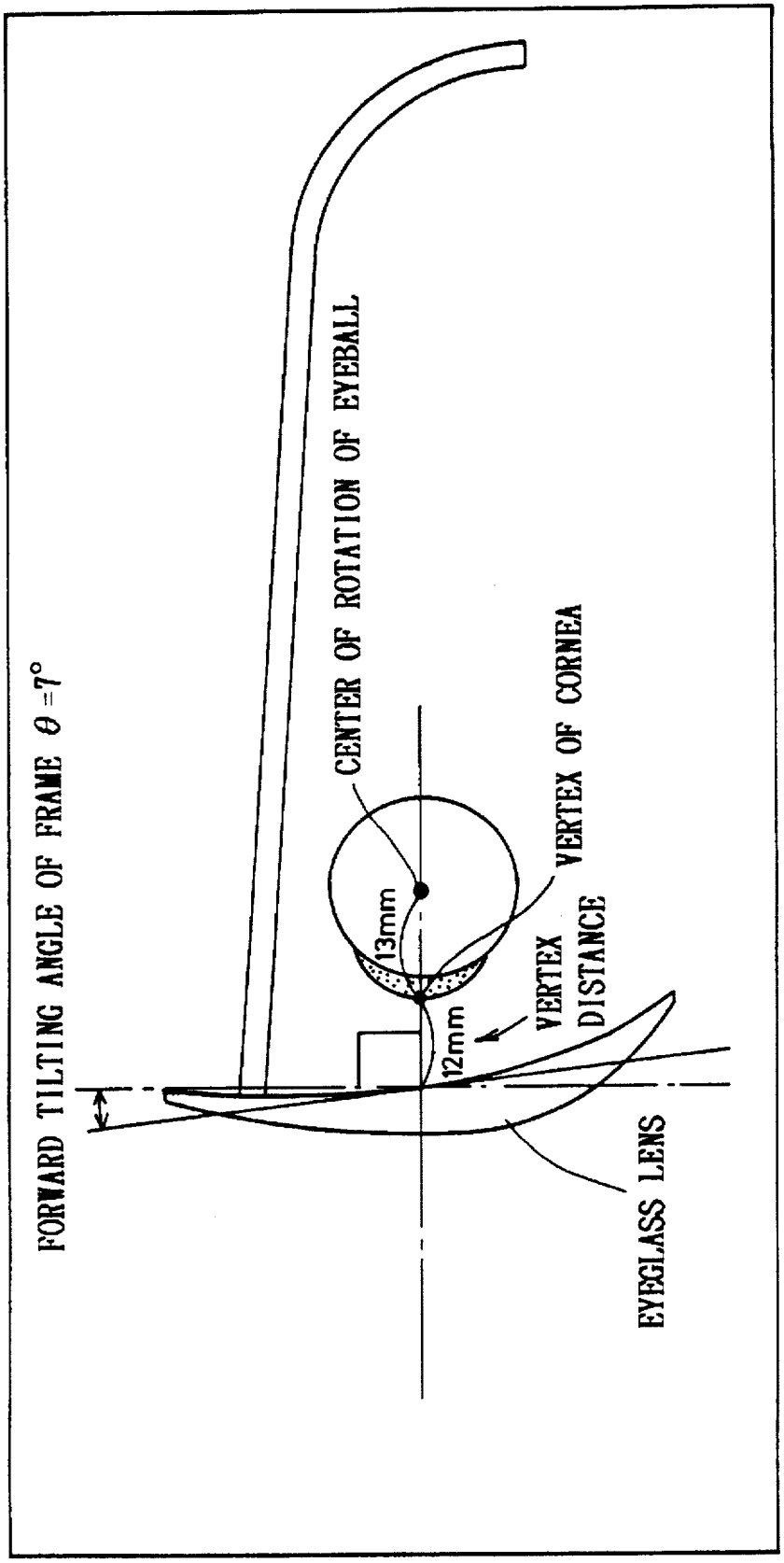
FIG. 22 is a diagram for illustrating the positional relation between a spectacle lens and an eyeball.

FIG. 20 is a diagram for indicating the width W1 of a region, in which values of a surface average additional refractive power along a horizontal section line extending below the near vision power measuring position N are not less than Di/2, in the diagram illustrating the surface average power distribution of the progressive power multifocal lens according to Embodiment 1 of FIG. 4. Further, FIG. 21 is a diagram for indicating the width W2 of a region, in which values of a surface average additional refractive power along a horizontal section line extending below the near vision power measuring position N are not less than Di/2, in the diagram illustrating the surface average power distribution of the progressive power multifocal lens according to Embodiment 2 of FIG. 12.

In the case of the progressive power multifocal lenses of these figures, which have the base curve of Bi diopters and the addition of Di diopters, let W(Di, Bi) represent a width of a region in which the value of surface additional refractive power along the horizontal section curve passing below the near vision power measuring position N is not less than Di. The width W1 of FIG. 20 is represented by W1(2.00, 2.00). Further, the width W2 of FIG. 21 is represented by W2(2.00, 7.00). Here, the comparison between the widths W1 and W2 reveals that there is little difference therebetween in the case where the regions respectively corresponding to the widths W1 and W2 are in the vicinity of the near vision power measuring position N and that the relation W2>W1 holds for the case where these regions are shifted downwardly from the position N.

Thus, it is found that the lenses of Embodiment 1 and Embodiment 2, which have additions of 2.00 diopters but a base curve of 7 diopters and a base curve of 2 diopters, respectively (incidentally, the base curve of 7 diopters>the base curve of 2 diopters), satisfy the following relation:

W2(2.00, 7.00)W1(2.00, 2.00).

Incidentally, the tendencies of the "transmission distributions" relative to the "surface distributions", which are known from the results respectively corresponding to Embodiment 1 and Embodiment 2, are shown in a table of FIG. 23.

Although the preferred embodiments of the present invention have been be described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A progressive power multifocal lens having fundamental elements, which include a far vision power measuring position (F) and a near vision power measuring position (N), and belonging to a group of progressive power multifocal lenses designed under a predetermined rule in such a manner that the fundamental elements meet a common wearing purpose, wherein a surface refractive power (in units of diopters) at the far vision power measuring position (F) is employed as a base curve (Bi), wherein a difference in surface refractive power between the far vision power measuring position (F) and the near vision power measuring position (N) is employed as an addition (Di (in units of diopters)), wherein arbitrary selection of two progressive power multifocal lenses, whose additions are Da and base curves are B1 and B2, respectively, from the group of the progressive power multifocal lenses, the following relation holds for B1>B2:

W(Da, B1)>W(Da, B2)

where W(Da, Bi) (i=1 or 2) is a width of a region in which values of a surface average additional refractive power along a horizontal section line extending below the near vision power measuring position (N) are not less than Di/2.

2. The progressive power multifocal lens according to claim 1, wherein using a single curve passing through at least both of the far vision power measuring position (F) and the near vision power measuring position (N) as a principal fixation line, a horizontal deviation H of an arbitrary point (P) on the principal fixation line towards the nose of a wearer with respect to the far vision power measuring position (F) is given by:

H=K·Dp/Di where K is an arbitrary constant meeting an inequality $1.0 \leq K \leq 5.0$; Dp the additional surface refractive power at the arbitrary point (P); and Di an addition.

3. The progressive power multifocal lens according to claim 1, wherein a change in optical conditions along a horizontal section curve intersecting with the principal fixation line at an arbitrary point (P) occurs in such a manner that in a portion where the principal fixation line is not horizontally deviated from the horizontal location of the far vision power measuring position (F), the optical conditions are symmetric with respect to a plane which contains the arbitrary point (P) and is perpendicular to the section curve and serves as a plane of mirror symmetry and that in another portion where the principal fixation line is horizontally deviated to a nose of a wearer from the horizontal location of the far vision power measuring position (F), the change in the optical conditions along a horizontal section curve extending from the arbitrary point (P) to the nose thereof is larger than the change in the optical conditions along another horizontal section curve extending from the arbitrary point (P) to an ear thereof.

4. The progressive power multifocal lens according to claim 1, wherein the addition Di has a value ranging from 0.75 diopters to 3.00 diopters, wherein when arbitrary two progressive power multifocal lenses, whose additions are Da and Db, respectively, and base curves are same with each other, are selected from the group of the progressive power multifocal lenses, the following relation holds for the addition Da>Db:

W(Da, X)>W(Db, X>Db/Da)

(incidentally, X=1.00 diopter)

where W(Di, X) (mm) (i=a or b) represents a width of a region in which values of astigmatism along the horizontal section curve passing through the near vision power measuring position (N) are not more than X.

5. The progressive power multifocal lens according to claim 1, wherein an arbitrary point (P) on a part of the principal fixation line, which is other than the far vision power measuring position (F) and the near vision power measuring position (N)p has two different principal curvatures.

* * * * *